(12) United States Patent
Yamada

(10) Patent No.: US 12,228,848 B2
(45) Date of Patent: Feb. 18, 2025

(54) OPTICAL DEFLECTION APPARATUS AND IMAGE PROJECTION APPARATUS

(71) Applicant: Tsukasa Yamada, Tokyo (JP)

(72) Inventor: Tsukasa Yamada, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 369 days.

(21) Appl. No.: 17/647,612

(22) Filed: Jan. 11, 2022

(65) Prior Publication Data

US 2022/0229356 A1 Jul. 21, 2022

(30) Foreign Application Priority Data

Jan. 15, 2021 (JP) ................. 2021-004947

(51) Int. Cl.
*G03B 21/20* (2006.01)
*G02B 26/10* (2006.01)

(52) U.S. Cl.
CPC ....... *G03B 21/2066* (2013.01); *G02B 26/101* (2013.01); *G03B 21/2006* (2013.01)

(58) Field of Classification Search
CPC ............ G03B 21/2066; G03B 21/2006; G03B 21/142; G02B 26/101; G02B 26/0816; H04N 9/3129
See application file for complete search history.

(56) References Cited

U.S. PATENT DOCUMENTS

| | | | | |
|---|---|---|---|---|
| 2009/0073526 A1* | 3/2009 | Uchikawa | ............ | G02B 26/105 359/202.1 |
| 2015/0055204 A1* | 2/2015 | Ichii | ...................... | G02B 26/101 359/214.1 |
| 2021/0263304 A1* | 8/2021 | Pilard | .................. | G02B 26/101 |
| 2022/0221712 A1* | 7/2022 | Yamada | ............... | H04N 9/3135 |

FOREIGN PATENT DOCUMENTS

| | | |
|---|---|---|
| DE | 102018211545 | 1/2020 |
| JP | 2009-069457 | 4/2009 |
| JP | 2015-041039 | 3/2015 |
| JP | 2019-053331 | 4/2019 |

OTHER PUBLICATIONS

Office Action mailed on Jun. 25, 2024 with respect to the corresponding Japanese patent application No. 2021-004947.

* cited by examiner

*Primary Examiner* — Magda Cruz
(74) *Attorney, Agent, or Firm* — IPUSA, PLLC

(57) ABSTRACT

An optical deflection apparatus includes an optical deflection part configured to deflect light incident on a reflection surface by swinging the reflection surface about a swing axis, and a light transmission plate configured to transmit the light deflected by the optical deflection part, wherein an inclination angle of the light transmission plate with reference to a reference surface is equal to or greater than twice a maximum swing angle of the reflection surface with reference to the reference surface.

9 Claims, 19 Drawing Sheets

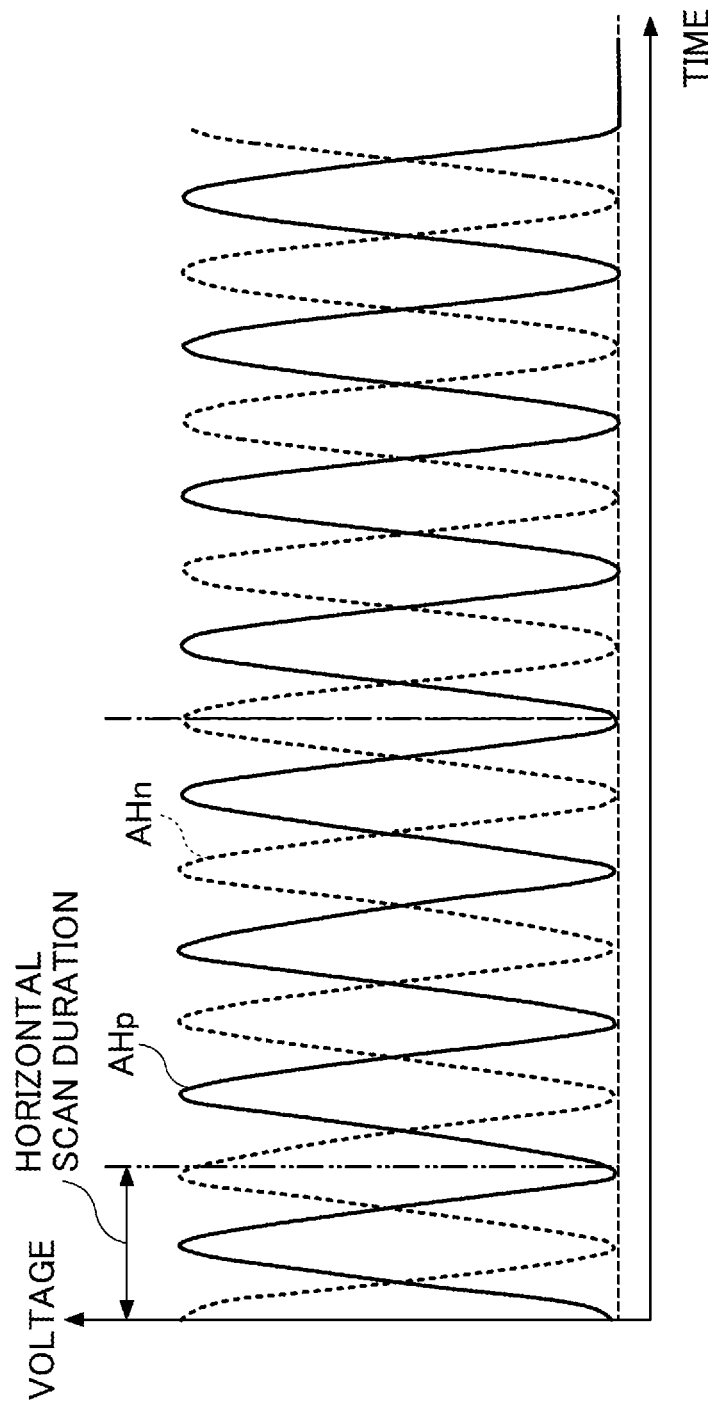

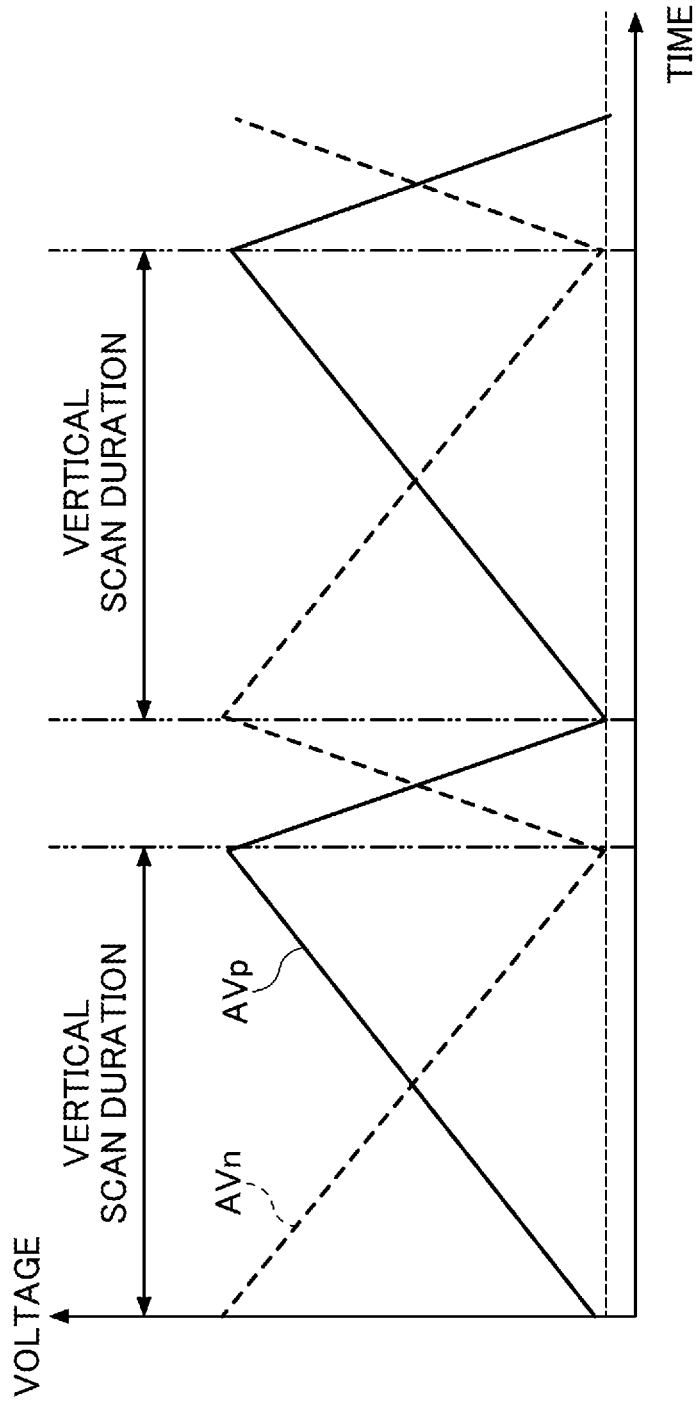

FIG.6
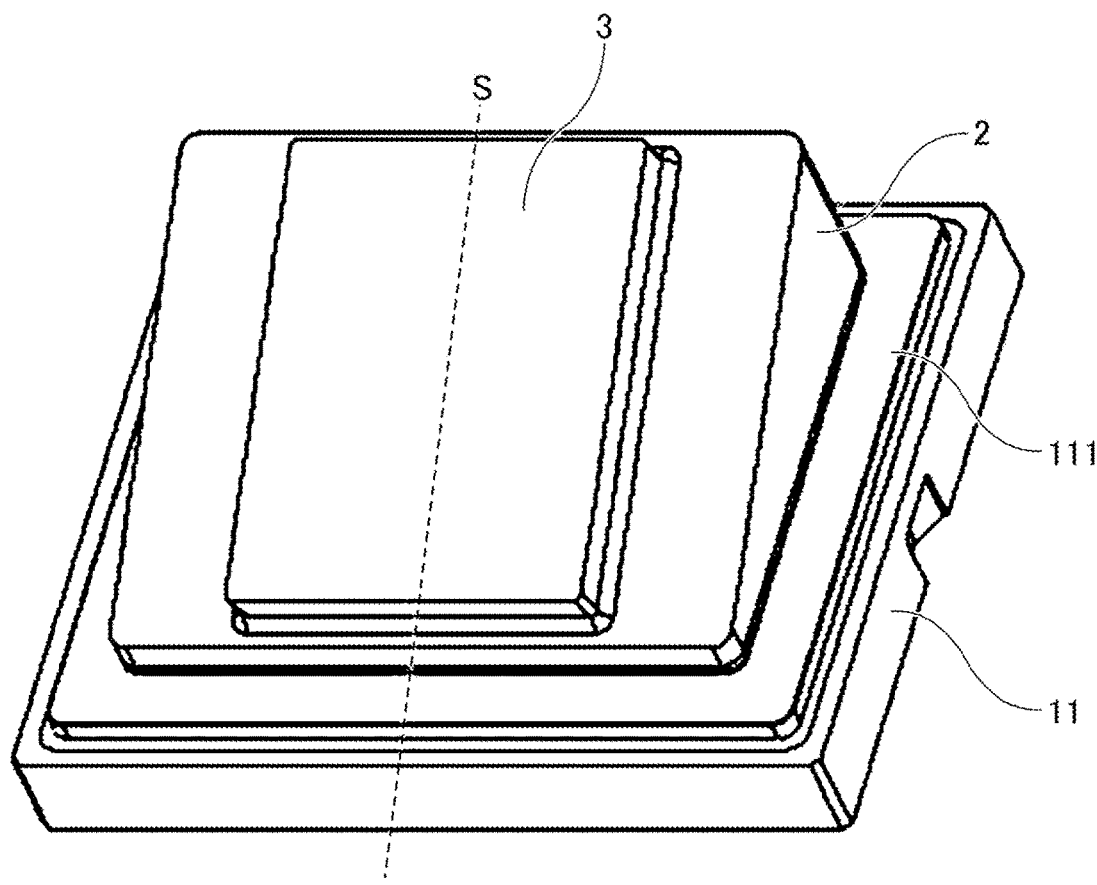
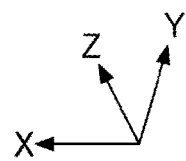

FIG.12B
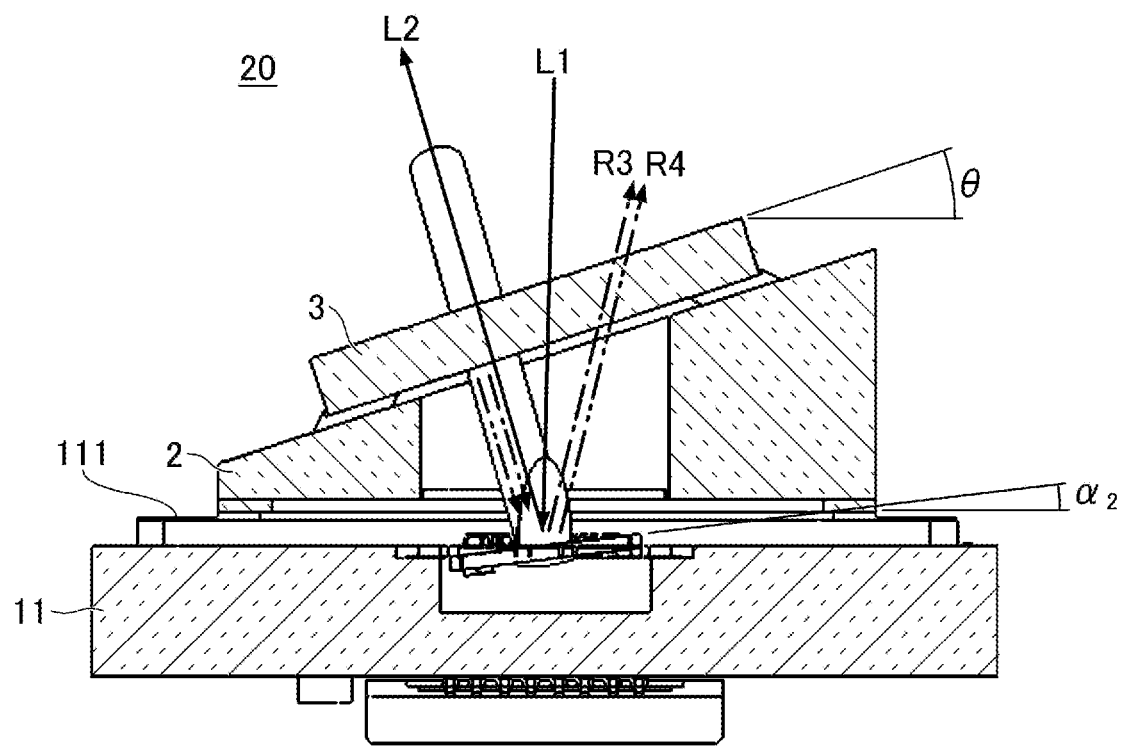
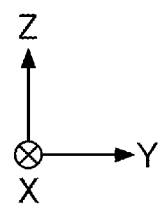

FIG.13A
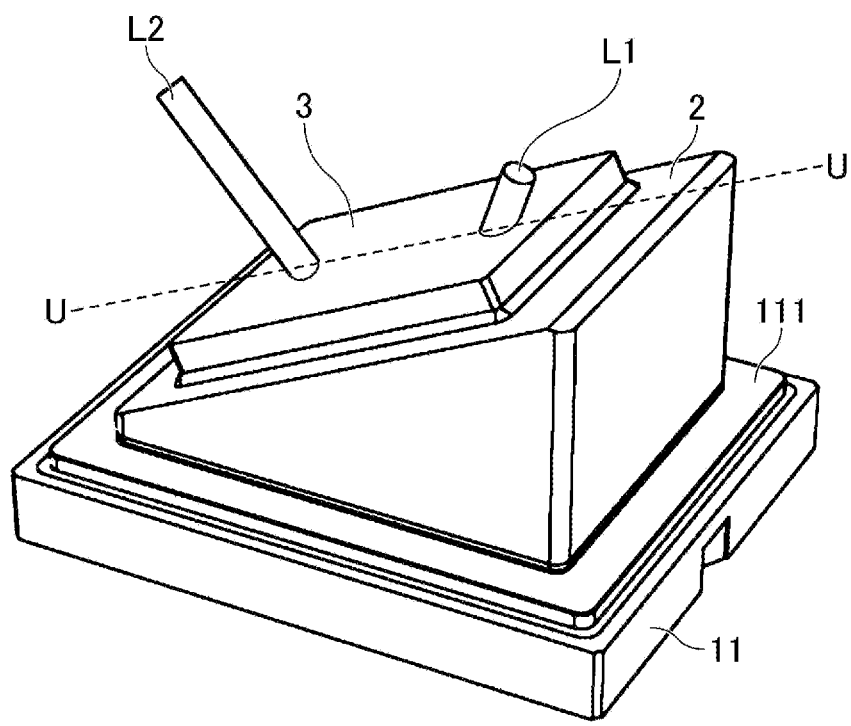
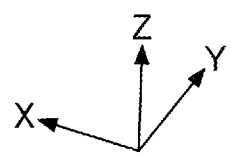

FIG.13B
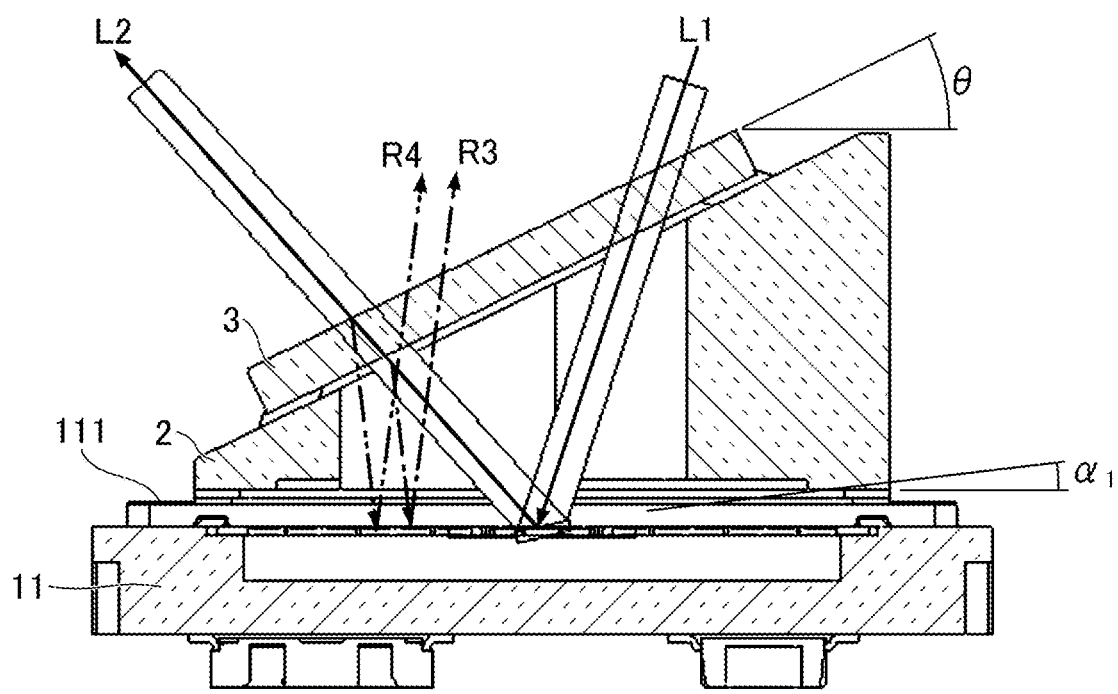
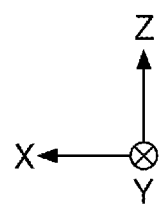

FIG.14A
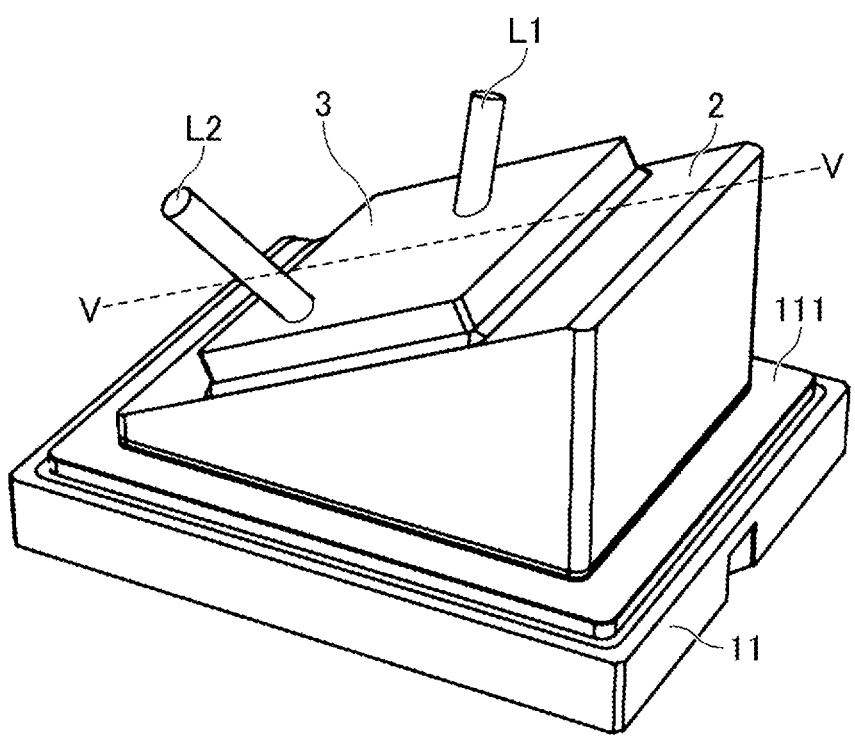
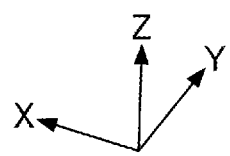

FIG.14B
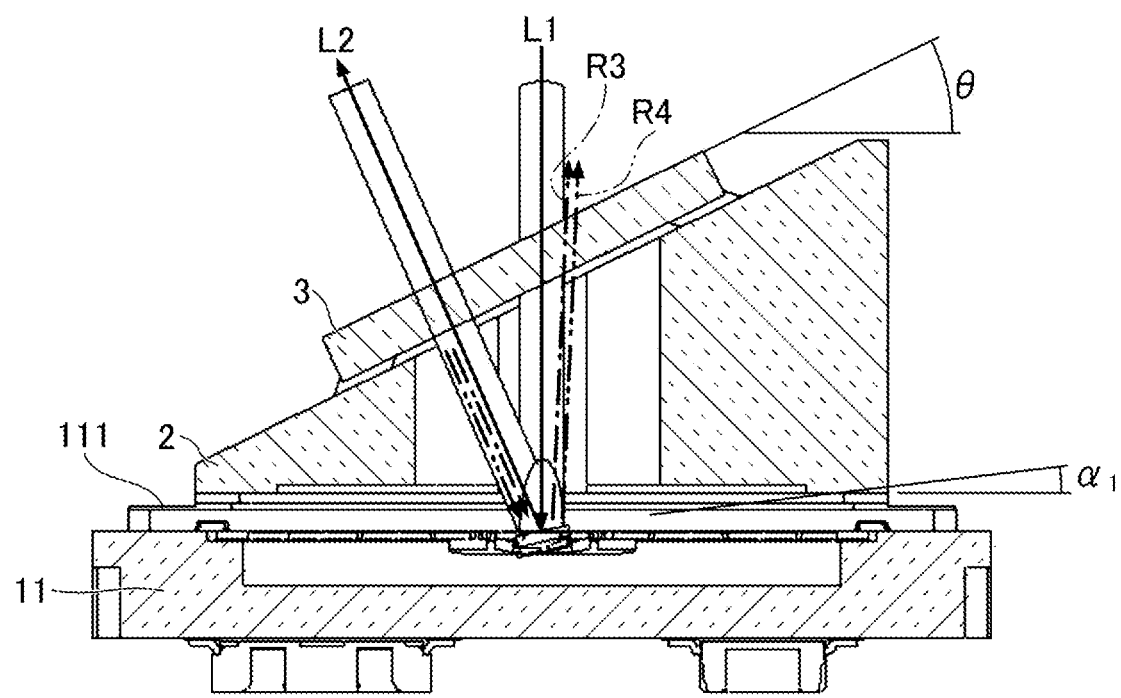
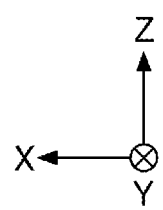

OPTICAL DEFLECTION APPARATUS AND IMAGE PROJECTION APPARATUS

CROSS-REFERENCE TO RELATED APPLICATION

This application claims priority under 35 U.S.C. § 119 to Japanese Patent Application No. 2021-004947, filed Jan. 15, 2021, the content of which is incorporated herein by reference in its entirety.

BACKGROUND

1. Field of the Invention

The present disclosure relates to an optical deflection apparatus and an image projection apparatus.

2. Description of the Related Art

Conventionally, an image projection apparatus projects an image on a scan-target surface using an optical deflection apparatus that deflects, at a reflection surface, light emitted from a light emitting unit.

Also, for example, Japanese Patent No. 6627994 discloses a configuration for reducing a maximum swing angle of a reflection surface with reference to a reference surface to less than an inclination angle of a light transmission plate with reference to the reference surface, in order to prevent an occurrence of an abnormal image on a scan-target surface.

SUMMARY

The present disclosure provides an optical deflection apparatus that includes an optical deflection part configured to deflect light incident on a reflection surface by swinging the reflection surface about a swing axis, and a light transmission plate configured to transmit the light deflected by the optical deflection part, wherein an inclination angle of the light transmission plate with reference to a reference surface is equal to or greater than twice a maximum swing angle of the reflection surface with reference to the reference surface.

BRIEF DESCRIPTION OF THE DRAWINGS

FIG. 5A is a drawing for explaining an example of a horizontal driving signal.

FIG. 5B is a drawing for explaining an example of a vertical driving signal.

FIG. 6 is a drawing illustrating an example of incidence and output of laser light by the optical deflection apparatus according to the embodiment.

FIG. 12B is a cross-sectional view taken along line T-T of FIG. 12A.

FIG. 13A is a perspective view of a second example of a combination of the height of the incident laser light and the inclination of the light transmission plate.

FIG. 13B is a cross-sectional view taken along line U-U of FIG. 13A.

FIG. 14A is a perspective view of a third example of a combination of the height of the incident laser light and the inclination of the light transmission plate.

FIG. 14B is a cross-sectional view taken along line V-V of FIG. 14A.

DESCRIPTION OF THE EMBODIMENTS

Figure 1:
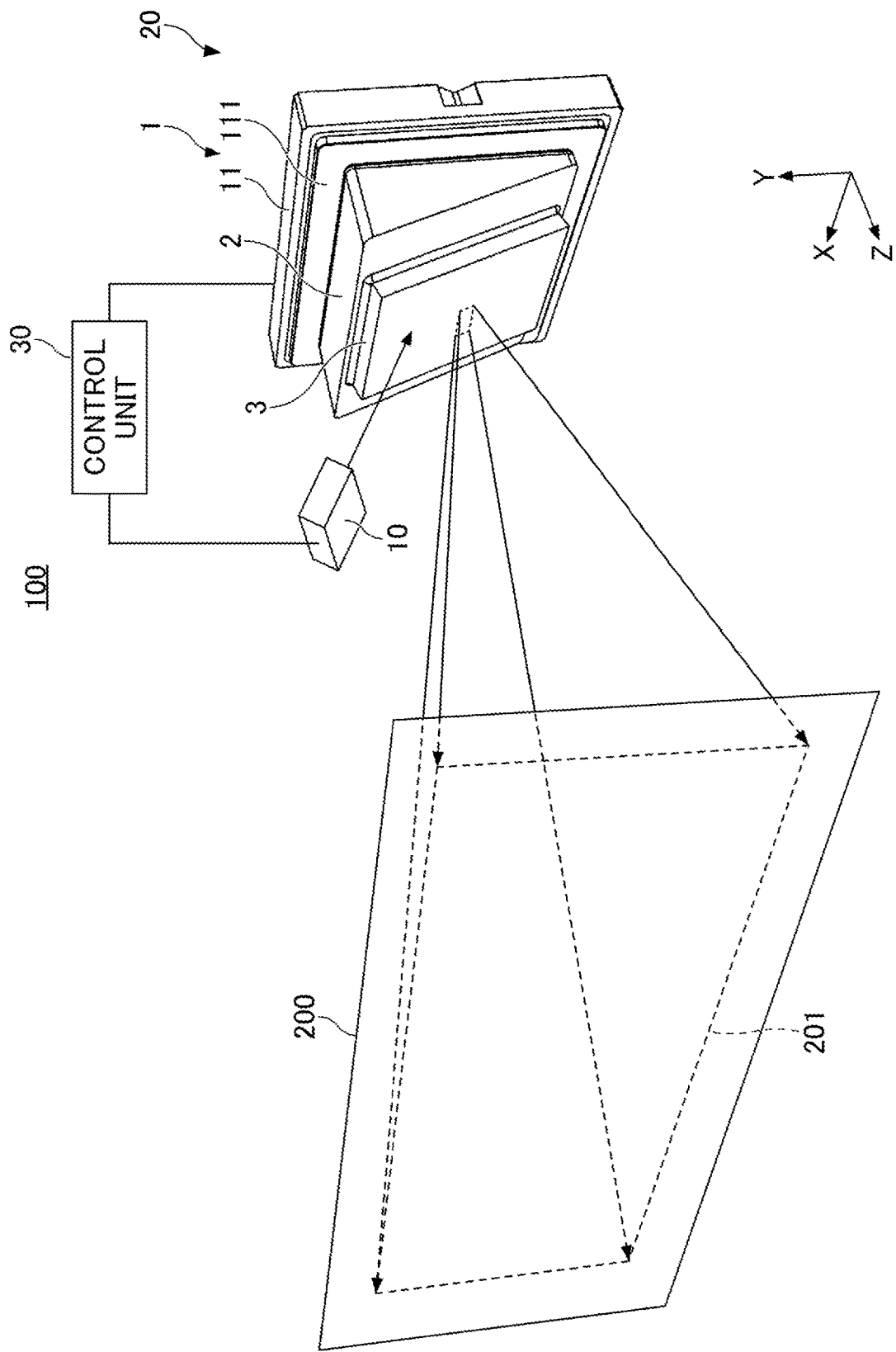
FIG. 1 is a perspective view illustrating an example of configuration of the entirety of an image projection apparatus according to an embodiment.

Hereinafter, one or more embodiments will be described with reference to the drawings. In the drawings, the same components are denoted with the same numerals and duplicate descriptions about the same components may be omitted.

The embodiment shown below is an example of an optical deflection apparatus and an image projection apparatus for implementing the technical idea of the present disclosure, and the present disclosure is not limited to the embodiment shown below. Unless otherwise specified, the dimensions, materials, shapes, relative arrangements, and the like of the components described below are not intended to limit the scope of the present disclosure to those described, but are intended to show examples. Furthermore, the sizes and the arrangements of the members shown in the drawings may be exaggerated for the sake of clarification of the explanation.

The optical deflection apparatus according to the embodiment includes: an optical deflection part configured to deflect light incident on a reflection surface by swinging the reflection surface around a swing axis; and a light transmission plate configured to transmit light deflected by the optical deflection part.

For example, such an optical deflection apparatus is used to scan a scan-target surface by deflecting light with an image projection apparatus and the like that projects an image onto the scan-target surface. The image projection apparatus may be, for example, a projector, a welcome projector of a vehicle, a head-up display, a head-mounted display, a headlamp of a vehicle, an object recognition apparatus, a distance measurement apparatus, an ocular fundus camera, or the like.

The welcome projector of the vehicle is a projector provided on a door or the like of the vehicle to project a desired image including a logo when the door is opened. The object recognition apparatus is an apparatus that detects and recognizes a presence or absence of an object or detects and recognizes a distance to an object, on the basis of reflected light or scattered light of projected light reflected or scattered by the object.

When the above-described optical deflection apparatus is used with an image projection apparatus or the like, a part of the light deflected by the optical deflection part may be reflected without being transmitted through the light transmission plate and returned to the optical deflection part, and may be deflected again by the reflection surface. Also, a part of the light that has been deflected again may be reflected without being transmitted through the light transmission plate and returned to the optical deflection part, and may be deflected by the reflection surface again.

When such reflected light of the light transmission plate is included in the projected image, ghosting, in which multiple images are observed in an overlapping manner, moiré, or the like may occur.

Also, when the light emitting unit emitting light to the reflection surface is provided on the opposite side of the light transmission plate from the reflection surface so that the light from the light emitting unit is transmitted through the light transmission plate and is then incident on the reflection surface, the projected image may include the light reflected by the light transmission plate in the incident light. When the projected image includes the reflected light of the incident light, dot-like stray light or the like may occur.

The light transmission plate includes a first surface and a second surface on the opposite side from the first surface, and therefore, ghosting or dot-like stray light occurs due to reflected light that occurs at both of the first surface and the second surface.

In the embodiment, the inclination of the light transmission plate angle with reference to the reference surface is equal to or greater than twice the maximum swing angle of the reflection surface with reference to the reference surface, so that the secondary reflected light that occurs at the light transmission plate is excluded from the projected image. Furthermore, the quality of the projected image is maintained at a high level.

In this case, the reference surface refers to a surface that serves as a reference of inclination of the reflection surface caused by swinging and that serves as a reference of inclination of the light transmission plate. The swing angle refers to an angle of inclination by which the reflection surface is inclined with reference to the reference surface by swinging. The maximum swing angle is the swing angle that is the greatest.

In the terminology of the embodiment, "deflection of light" refers to changing the traveling direction of light. In the embodiment, the reflection surface deflects light by reflecting the light.

Hereinafter, an embodiment is explained with reference to the image projection apparatus including the optical deflection apparatus according to the embodiment as an example.

In the following drawings, directions may be indicated by the X axis, the Y axis, and the Z axis. The X direction along the X axis indicates a direction in which the first optical deflection part provided in the optical deflection apparatus according to the embodiment deflects and scans light. The Y direction along the Y axis indicates a direction in which the second optical deflection part provided in the optical deflection apparatus according to the embodiment deflects and scans light. The X axis and the Y axis are substantially perpendicular to each other. The Z direction along the Z axis indicates a direction substantially perpendicular to both of the X axis and the Y axis.

A direction indicated by an arrow in the X direction is denoted as +X direction, a direction opposite to +X direction is denoted as −X direction, a direction indicated by an arrow in the Y direction is denoted as +Y direction, a direction opposite to +Y direction is denoted as −Y direction, a direction indicated by an arrow in the Z direction is denoted as +Z direction, and a direction opposite to the +Z direction is denoted as −Z direction. However, the above is not intended to impose limitation on the direction in which the optical deflection apparatus and the image projection apparatus are used, and the optical deflection apparatus and the image projection apparatus may be provided in any desired direction.

<Example of Configuration of Image Projection Apparatus 100>

First, an example of configuration of the entirety of an image projection apparatus 100 according to the embodiment and the configuration of an optical deflection apparatus 20 provided in the image projection apparatus 100 are explained with reference to FIG. 1 and FIGS. 2A to 2D.

Figure 2A:
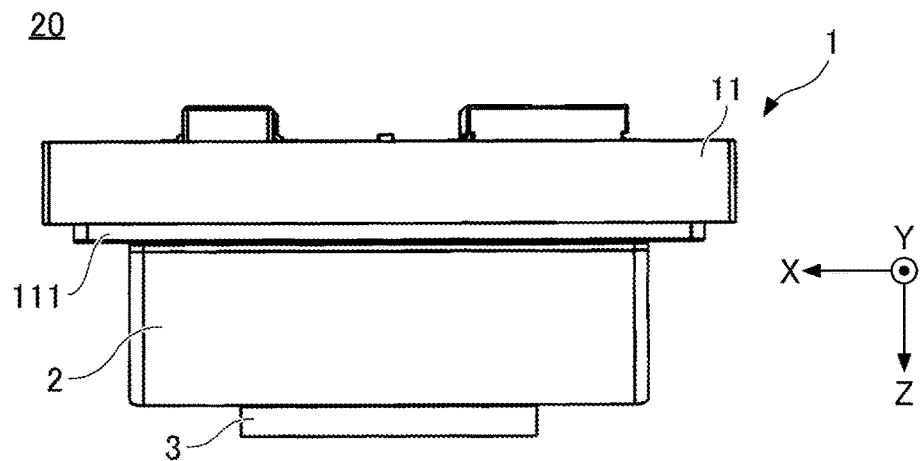
FIG. 2A is a plan view illustrating an example of configuration of an optical deflection apparatus according to the embodiment.
Figure 2B:
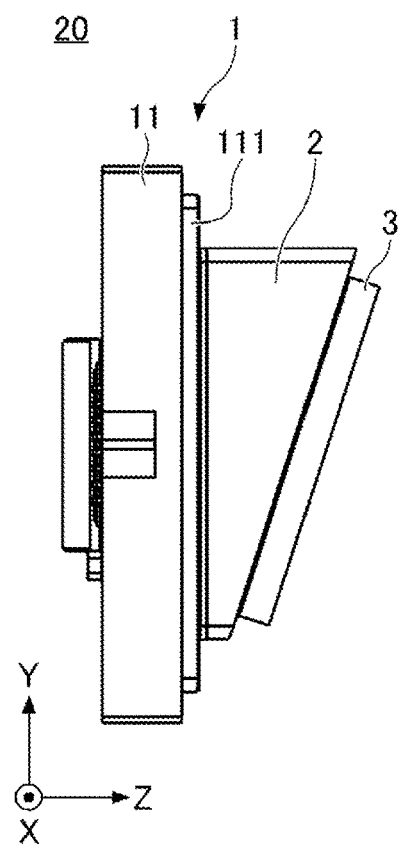
FIG. 2B is a left side view illustrating the example of configuration of the optical deflection apparatus according to the embodiment.
Figure 2C:
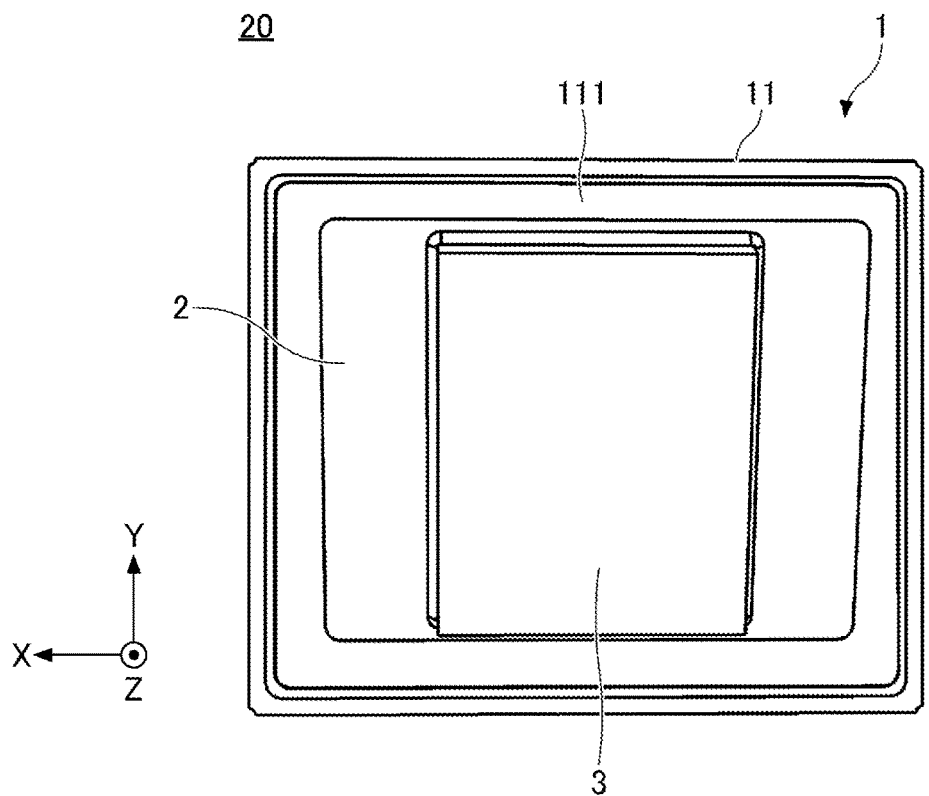
FIG. 2C is a front view illustrating the example of configuration of the optical deflection apparatus according to the embodiment.
Figure 2D:
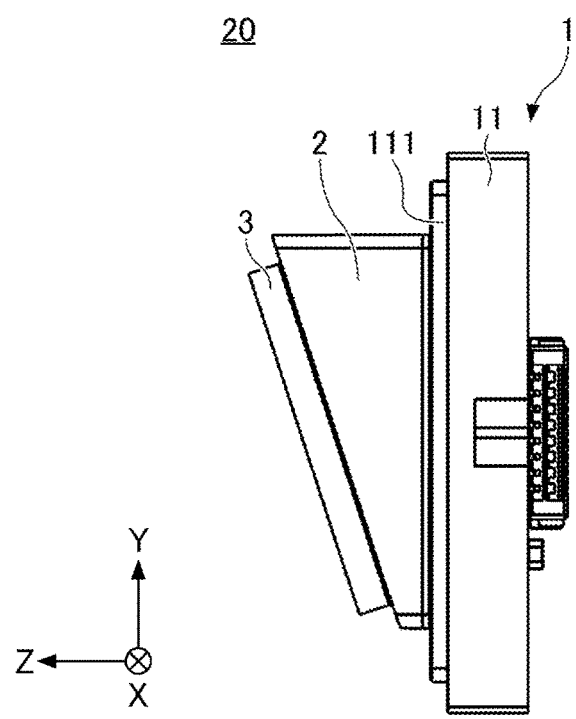
FIG. 2D is a right side view illustrating the example of configuration of the optical deflection apparatus according to the embodiment.

FIG. 1 is a perspective view illustrating the example of configuration of the entirety of the image projection apparatus 100 according to an embodiment. FIG. 2A is a plan view illustrating an example of configuration of the optical deflection apparatus 20 according to the embodiment. FIG. 2B is a left side view illustrating the example of configuration of the optical deflection apparatus 20 according to the embodiment. FIG. 2C is a front view illustrating the example of configuration of the optical deflection apparatus 20 according to the embodiment. FIG. 2D is a right side view illustrating the example of configuration of the optical deflection apparatus 20 according to the embodiment.

As illustrated in FIG. 1, the image projection apparatus 100 includes a light emitting unit 10, the optical deflection apparatus 20, and a control unit 30, which are provided in the body of the image projection apparatus 100.

The image projection apparatus 100 causes the optical deflection apparatus 20 to scan, in the X direction and the Y direction, the laser light in respective wavelengths, i.e., red, green, blue, and IR (infrared) emitted by the light emitting unit 10, under the control of the control unit 30 to project an image 201 in full color onto a scan-target surface 200.

In the present embodiment, as an example, the Y direction corresponds to the gravity direction, and the X direction corresponds to a horizontal direction substantially perpendicular to the gravity direction. The optical deflection apparatus 20 deflects laser light of each of the wavelengths of red, green, blue, and IR emitted by the light emitting unit 10 to scan the laser light in two directions, i.e., the X direction and the Y direction, on the scan-target surface 200.

However, the image 201 projected by the image projection apparatus 100 is not limited to images in full color, and may be monochrome images and the like. In a case where a monochrome image is projected, the image projection apparatus 100 scans the monochrome laser light on the scan-target surface 200.

In a case where the image projection apparatus 100 is a projector, the scan-target surface 200 corresponds to a screen and the like. In a case where the image projection apparatus 100 is a head-up display, the scan-target surface 200 corresponds to a front windshield and the like of an automobile.

In a case where the image projection apparatus 100 is a head-mounted display or an ocular fundus camera, the scan-target surface 200 corresponds to a hologram optical element, the retina of an eyeball, and the like. In a case where the image projection apparatus 100 is a headlamp, an object recognition apparatus, or a distance measurement apparatus of a vehicle, the scan-target surface 200 corresponds to a virtual plane in a space.

The light emitting unit 10 includes an LD (Laser Diode) emitting laser light in red, an LD emitting laser light in green, an LD emitting laser light in blue, and an LD emitting laser light in IR. The light emitting unit 10 causes laser light in respective colors, i.e., red, green, blue, and IR, emitted from the LDs of the respective wavelengths, to be incident on the optical deflection apparatus 20. The laser light of respective colors is an example of light emitted by a light emitting unit.

As illustrated in FIG. 1 and FIG. 2, the optical deflection apparatus 20 includes an optical deflection unit 1, a lid 2, and a light transmission plate 3. The lid 2 is provided on +Z direction side of the optical deflection unit 1, and the light transmission plate 3 is provided on +Z direction side of the lid 2.

The optical deflection unit 1 includes an optical deflection part and a package 11, and is configured to deflect the laser light emitted by the light emitting unit 10.

The package 11 is a box-shaped member for holding the optical deflection part in the inside of the package 11. The package 11 is configured to include: alumina ceramic; a metal material such as aluminum, aluminum alloy, or stainless steel; or a plastic material. The package 11 includes a circuit board and the like constituted by fiber reinforced plastics (FRP), flexible printed circuits (FPC), or the like.

The configuration and the function of the optical deflection part is explained later with reference to FIG. 3 and FIG. 4.

The lid 2 is configured to include: alumina ceramic; a metal material such as aluminum, aluminum alloy, or stainless steel; or a plastic material. The lid 2 is a columnar member of which the cross-sectional shape is a rectangle. The lid 2 is bonded by an adhesive and the like to the package 11, with an end portion of the lid 2 on −Z direction side being in contact with an attachment surface 111 of the package 11 on +Z direction side. This attachment surface 111 corresponds to an example of a reference surface.

The end portion of the lid 2 on +Z direction side is formed to be inclined with reference to the attachment surface 111. With the inclined end portion of the lid 2 being in contact with the light transmission plate 3, the lid 2 fixes and holds the light transmission plate 3 by an adhesive, bonding with low-melting glass, or the like.

The light transmission plate 3 is a plate-shaped member that transmits the laser light emitted by the light emitting unit 10 and transmits laser light deflected by the optical deflection part included in the optical deflection unit 1. The light transmission plate 3 serves as not only an input window that allows laser light to enter from the outside to the inside of the optical deflection apparatus 20 but also an output window that allows laser light to exit from the inside to the outside of the optical deflection apparatus 20.

The light transmission plate 3 is made of materials transparent with respect to the wavelength of laser light in each wavelength emitted by the light emitting unit 10, such as optical glass, heat-resistant glass, hard glass, optical plastic, and hard plastic. Antireflection films for preventing reflection of incident laser light are provided on both of the first surface of the light transmission plate 3 and the second surface opposite to the first surface.

The end portion on +Z direction side of the lid 2 that is in contact with the light transmission plate 3 is inclined with reference to the attachment surface 111, and accordingly, the light transmission plate 3 is also held on the lid 2 with an inclination with reference to the attachment surface 111. The lid 2 and the light transmission plate 3 provide sealing so as to prevent dust, dirt, or the like from adhering to the optical deflection part of the optical deflection unit 1 and prevent intrusion of moisture or oxygen into the optical deflection part of the optical deflection unit 1.

The control unit 30 controls the light emission of the LD of each color achieved by the light emitting unit 10 by applying a driving signal such as a driving voltage to the light emitting unit 10. The control unit 30 controls the scanning of the laser light achieved by the optical deflection apparatus 20 by applying a driving signal such as a driving voltage to the optical deflection apparatus 20.

The functions of the control unit 30 may be achieved by an electric circuit. Alternatively, some or all of the functions may be achieved by software that is executable by a central processing unit (CPU).

<Example of Configuration of Optical Deflection Unit 1>

Next, the configuration of the optical deflection unit 1 is explained with reference to FIG. 3 and FIG. 4. FIG. 3 is a perspective view illustrating an example of configuration of the optical deflection unit 1. For the sake of explanation, FIG. 3 illustrates the optical deflection unit, with the lid 2 and the light transmission plate 3 of the optical deflection apparatus 20 detached.

Figure 3:
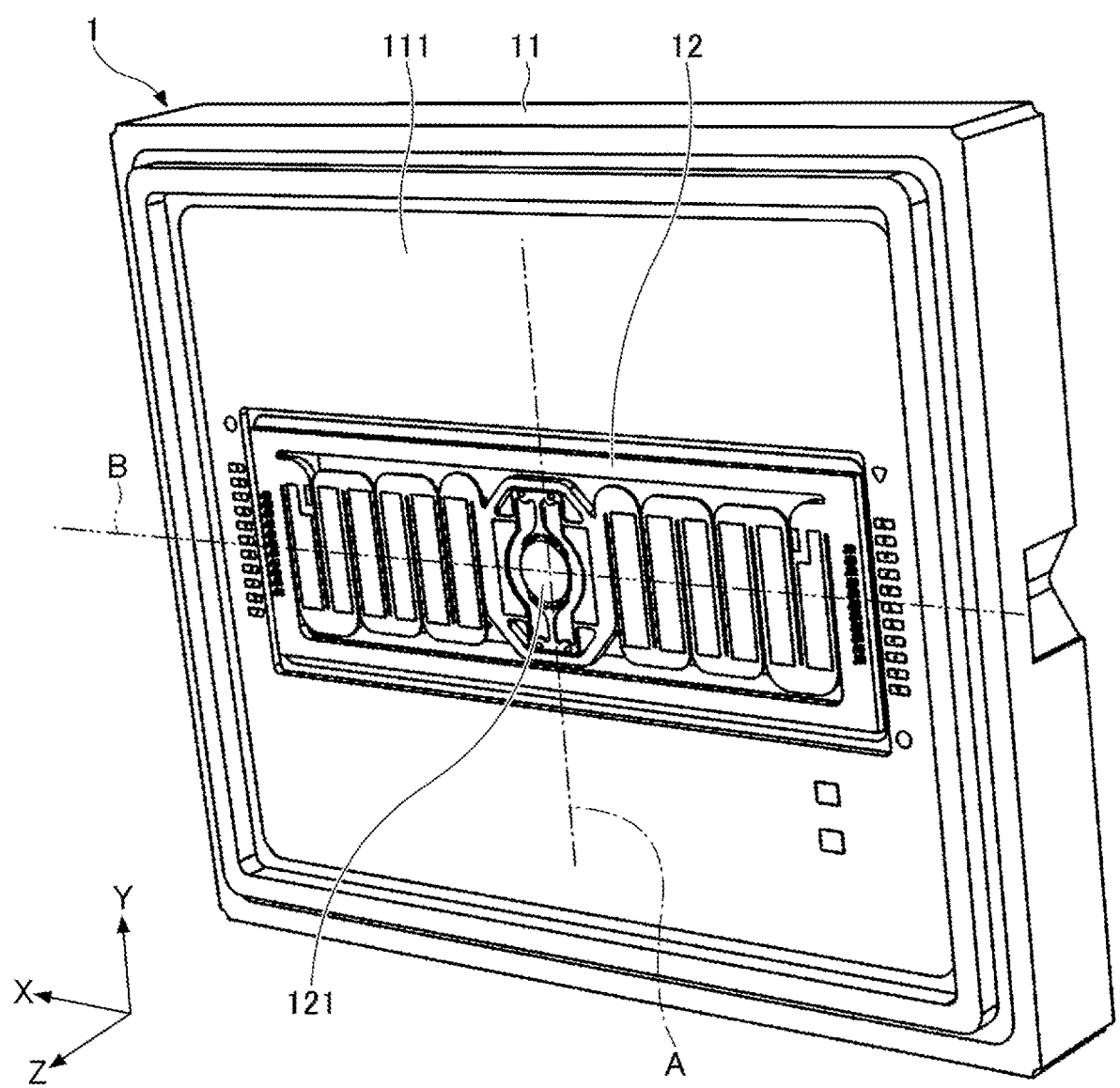
FIG. 3 is a perspective view illustrating an example of configuration of an optical deflection unit according to the embodiment.

As illustrated in FIG. 3, the optical deflection unit 1 includes a package 11 and an optical deflection part 12. The optical deflection part 12 is held on the package 11 such that a reflection surface 121 of the optical deflection part 12 is provided around the center of the package 11. The optical deflection unit 1 may have a circuit in the package 11, or may have a substrate, a control circuit, and the like under the package 11.

The optical deflection part 12 deflects the laser light incident on the reflection surface 121 by swinging the reflection surface 121 about each of the first swing axis A and the second swing axis B. The optical deflection part 12 is, for example, a MEMS (Micro Electro Mechanical Systems) mirror or the like that drives the reflection surface 121 by a piezoelectric element. In this case, the first swing axis A is an example of a swing axis, and is also an example of a first axis. The second swing axis B is an example of a second axis.

Figure 4:
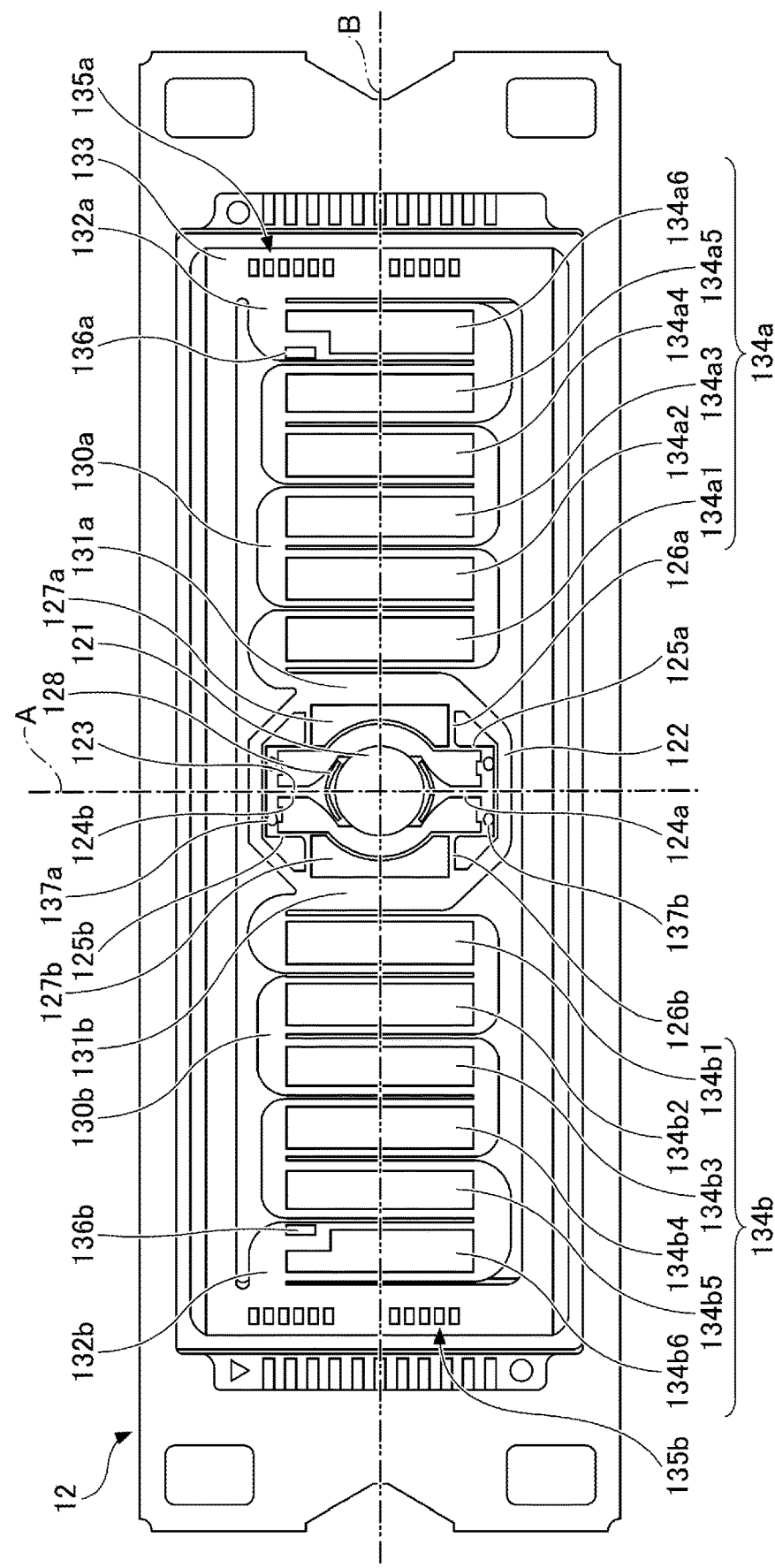
FIG. 4 is a drawing illustrating an example of configuration of an optical deflection part according to the embodiment.

Next, FIG. 4 is a drawing illustrating an example of configuration of the optical deflection part 12. As illustrated in FIG. 4, the optical deflection part 12 includes a reflection surface 121, a movable frame 122 supporting the reflection surface 121 from the outside, and a pair of second driving beams 130*a* and 130*b* supporting the movable frame 122 from both sides.

The movable frame connection portion 131*a* is a portion connecting the movable frame 122 and the second driving beam 130*a*. The fixed frame connection portion 132*a* is a portion connecting the fixed frame 133 and the second driving beam 130*a*.

The movable frame connection portion 131*b* is a portion connecting the movable frame 122 and the second driving beam 130*b*. The fixed frame connection portion 132*b* is a portion connecting the fixed frame 133 and the second driving beam 130*b*.

The optical deflection part 12 includes a reflection surface 121, a movable frame 122, a support portion 123, torsional beams 124*a* and 124*b*, connection beams 125*a* and 125*b*, first driving beams 126*a* and 126*b*, second driving beams 130*a* and 130*b*, and a fixed frame 133.

The first driving beam 126*a* includes a drive source 127*a*, and the first driving beam 126*b* includes a drive source 127*b*. The second driving beam 130*a* includes a drive source 134*a*, and the second driving beam 130*b* includes a drive source 134*b*.

The first driving beams 126*a* and 126*b* serve as actuators for deflecting laser light by swinging the reflection surface 121 about the first swing axis A. The second driving beams 130*a* and 130*b* serve as actuators for deflecting laser light by swinging the reflection surface 121 about the second swing axis B.

In the support portion 123, slits 128 are formed along the circumference of the reflection surface 121. With the slits 128, while the stress concentration generated by the torsional motion of the torsional beams 24*a* and 24*b* can be dispersed to prevent damage to the reflection surface 121, the torsion caused by the torsional beams 124*a* and 124*b* can be transmitted to the reflection surface 121.

In the optical deflection part 12, the reflection surface 121 is supported on the upper surface of the support portion 123, and the support portion 123 is connected to the torsional beams 124*a* and 124*b* provided on both sides. The torsional beams 124*a* and 124*b* constitute the first swing axis A, extending along the direction of the first swing axis A and supporting the support portion 123 from both sides in the direction of the first swing axis A.

When the torsional beams 124*a* and 124*b* are twisted, the reflection surface 121 supported by the support portion 123 swings to cause reflected light of laser light incident on the reflection surface 121 to deflect and perform scanning. The torsional beams 124*a* and 124*b* are connected to and supported by the connection beams 125*a* and 125*b*, respectively, which in turn are connected to the first driving beams 126*a* and 126*b*, respectively.

The first driving beams 126*a* and 126*b*, the connection beams 125*a* and 125*b*, the torsional beams 124*a* and 124*b*, the support portion 123, and the reflection surface 121 are supported from the outside by the movable frame 122.

One side of each of the first driving beams 126*a* and 126*b* is supported by the movable frame 122. The other side of the first driving beam 126*a* extends toward the inner side, and is connected to each of the connection beams 125*a* and 125*b*. Likewise, the other side of the first driving beam 126*b* extends toward the inner side, and is connected to each of the connection beams 125*a* and 125*b*.

The first driving beams 126*a* and 126*b* are provided to constitute a pair such that the reflection surface 121 and the support portion 123 are provided between the first driving beams 126*a* and 126*b* in a direction perpendicular to the torsional beams 124*a* and 124*b*. The first drive source 127*a* is formed on the upper surface of the first driving beam 126*a*, and the first drive source 127*b* is formed on the upper surface of the first driving beam 126*b*.

The drive sources 127*a* and 127*b* include: upper electrodes formed in thin films of piezoelectric elements (hereinafter also referred to as "piezoelectric thin films") on the upper surfaces of the first driving beam 126*a* and 126*b*; and lower electrodes formed in piezoelectric thin films on the lower surfaces of the first driving beam 126*a* and 126*b*. The drive sources 127*a* and 127*b* expand and contract depending on the polarity of the driving voltage applied to the upper and lower electrodes.

Therefore, when voltages of different phases are applied alternately to the first driving beam 126*a* and the first driving beam 126*b*, the first driving beam 126*a* and the first driving beam 126*b* alternately vibrate, on the left side and the right side of the reflection surface 121, to the opposite sides in the vertical direction.

Accordingly, the reflection surface 121 can swing about the torsional beams 124*a* and 124*b* that serve as the first swing axis A. For example, resonant vibration is used to swing the first driving beams 126*a* and 126*b* about the first swing axis A, so that the reflection surface 121 can swing at a high speed.

In this case, FIG. 5A is a drawing for explaining an example of a horizontal driving signal. FIG. 5B is a drawing for explaining an example of a vertical driving signal.

As illustrated in FIGS. 5A and 5B, both of the horizontal driving signal AHp and a horizontal driving signal AHn are sine waves with the same cycle and amplitude, and a horizontal driving signal AHn is shifted by half the cycle with respect to the horizontal driving signal AHp. Specifically, the horizontal driving signals AHp and AHn are in such a relationship that the potentials of the horizontal driving signals AHp and AHn are inverted with reference to the intermediate potential. The reflection surface 121 is driven according to a potential difference between the horizontal driving signal AHp and the horizontal driving signal AHn, and the swing angle of the reflection surface 121 corresponds to the amplitude of the horizontal driving signal AHp and the horizontal driving signal AHn.

Back to FIG. 4, the outside of the movable frame 122 is connected to the inner ends of the second driving beams 130*a* and 130*b* via movable frame connection portions 131*a* and 131*b*, respectively. The second driving beams 130*a* and 130*b* are provided to constitute a pair such that the movable frame 122 is interposed between the second driving beams 130*a* and 130*b*. The second driving beams 130*a* and 130*b* support the movable frame 122 from both sides and swing the movable frame 122 about the second swing axis B.

The outer end of the second driving beam 130*a* is connected to the inside of the fixed frame 133 via the fixed frame connection portion 132*a*. The outer end of the second driving beam 130*b* is connected to the inside of the fixed frame 133 via the fixed frame connection portion 132*b*.

As illustrated in FIG. 4, the second driving beam 130*a* includes: multiple vertical beams in a rectangular shape extending in a direction along the first swing axis A; and a folded portion for connecting the ends of adjacent vertical beams with each other, and has a zigzag shape as a whole.

For example, counting from the side closer to the first driving beam 126*a*, the end of the first vertical beam and the end of the second vertical beam are connected by a folded portion. The end of the second vertical beam and the end of the third vertical beam are connected by a folded portion. The end of the third vertical beam and the end of the fourth vertical beam are connected by a folded portion. The end of the fourth vertical beam and the end of the fifth vertical beam are connected by a folded portion. The end of the fifth vertical beam and the end of the sixth vertical beam are connected by a folded portion.

Likewise, the second driving beam 130*b* includes: multiple vertical beams in a rectangular shape extending in a direction along the first swing axis A; and a folded portion for connecting the ends of adjacent vertical beams with each other, and has a zigzag shape as a whole.

For example, counting from the side closer to the first driving beam 126b, the end of the first vertical beam and the end of the second vertical beam are connected by a folded portion. The end of the second vertical beam and the end of the third vertical beam are connected by a folded portion. The end of the third vertical beam and the end of the fourth vertical beam are connected by a folded portion. The end of the fourth vertical beam and the end of the fifth vertical beam are connected by a folded portion. The end of the fifth vertical beam and the end of the sixth vertical beam are connected by a folded portion.

For each of the vertical beams that are rectangular units not including curved portions, the drive source 134a is formed on the upper surface of the second driving beam 130a. For each of the vertical beams that are rectangular units not including curved portions, the drive source 134b is formed on the upper surface of the second driving beam 130b.

The drive source 134a includes: upper electrodes formed in piezoelectric thin films on the upper surface of the second driving beam 130a; and lower electrode formed in piezoelectric thin films on the lower surfaces of the second driving beam 130b. The drive source 134b includes: upper electrodes formed in piezoelectric thin films on the upper surface of the second driving beam 130a; and lower electrodes formed in piezoelectric thin films on the lower surface of the second driving beam 130b.

By applying a driving voltage to the vertical beams adjacent to each other of the drive sources 134a and 134b, the second driving beams 130a and 130b bend all the vertical beams in an upward direction to transmit the accumulation of upward and downward motions of the vertical beams to the movable frame 122.

According to this operation, the second driving beams 130a and 130b swing the reflection surface 121 about the second swing axis B. For example, non-resonant vibration can be used to drive the second driving beams 130a and 130b to swing.

For example, the drive source 134a includes drive sources 134a1, 134a2, 134a3, 134a4, 134a5, and 134a6, which are arranged toward the right side from the movable frame 122. The drive source 134b includes drive sources 134b1, 134b2, 134b3, 134b4, 134b5, and 134b6, which are arranged toward the left side from the movable frame 122. In this case, sawtooth-shaped waveforms of the same shape are applied to the drive sources 134a1, 134b1, 134a3, 134b3, 134a5, 134b5, and 134b6, and sawtooth-shaped waveforms of the same shape obtained by inverting in time series the above sawtooth-shaped waveforms are applied to the drive sources 134a2, 134b2, 134a4, 134b4, 134a6, and 134b6, so that the reflection surface 121 swings about the second swing axis B.

The driving wires for applying driving voltages to the upper electrodes and the lower electrodes of the drive source 127a are connected to predetermined terminals included in a terminal group 135a provided in the fixed frame 133. The driving wires for applying driving voltages to the upper electrodes and the lower electrodes of the drive source 127b are connected to predetermined terminals included in a terminal group 135b provided in the fixed frame 133.

The driving wires for applying driving voltages to the upper electrodes and the lower electrodes of the drive source 134a are connected to predetermined terminals included in the terminal group 135a provided in the fixed frame 133. The driving wires for applying driving voltages to the upper electrodes and the lower electrodes of the drive source 134b are connected to predetermined terminals included in a terminal group 135b provided in the fixed frame 133.

The optical deflection part 12 includes horizontal piezoelectric sensors 137a and 137b that are horizontal swing angle sensors for detecting the degree of inclination in the horizontal direction (a swing angle in the horizontal direction) while the reflection surface 121 swings in the horizontal direction and that are vibration sensors for detecting the emission timing of laser light. The horizontal piezoelectric sensors 137a and 137b are provided with the connection beams 125a and 125b.

Further, the optical deflection part 12 includes vertical piezoelectric sensors 136a and 136b that are vertical swing angle sensors for detecting the degree of inclination in the vertical direction (a swing angle in the vertical direction) while the reflection surface 121 swings in the vertical direction and that are vibration sensors for detecting unnecessary vibration of the vertical beams in order to remove an unnecessary vibration component from the driving signals. The vertical piezoelectric sensors 136a and 136b are provided in one of the vertical beams constituting the second driving beams 130a and 130b.

The optical deflection part 12 can be produced by, for example, a semiconductor process using a SOI (Silicon On Insulator) substrate including a support layer, a BOX (Buried Oxide) layer, and an active layer.

In the present embodiment, a first maximum swing angle $\alpha_1$ about the first swing axis A is configured to be greater than a second maximum swing angle $\alpha_2$ about the second swing axis B. For example, the first maximum swing angle $\alpha_1$ is ±12.0 [degrees], and the second maximum swing angle $\alpha_2$ is ±7.0 [degrees]. The first maximum swing angle $\alpha_1$ corresponds to the maximum swing angle $\alpha$.

<Operation of Inclination of Light Transmission Plate 3>

In this case, as described above, in the optical deflection apparatus having the light transmission plate, a part of the light deflected by the optical deflection part may be reflected without being transmitted through the light transmission plate and returned to the optical deflection part, and may be deflected again by the optical deflection part, so that the light deflected again may be included in the projected image. Also, a part of the light incident on the optical deflection apparatus may be reflected by the light transmission plate, and the reflected light may be included in the projected image. Hereinafter, an inclination of the light transmission plate 3 in relation to the reflected light reflected by the light transmission plate 3 is explained.

FIG. 6 is a drawing illustrating an example of incidence of laser light to the optical deflection apparatus 20 and output of laser light from the optical deflection apparatus 20. The incident laser light is transmitted through the light transmission plate 3 and is incident on the optical deflection apparatus 20. The output laser light is transmitted through the light transmission plate 3 and exits from the optical deflection apparatus 20.

In the example as illustrated in FIG. 6, along the plane including the first swing axis A along the Y axis, the incident laser light is incident on the optical deflection apparatus 20, and the output laser light is output from the optical deflection apparatus 20.

Figure 7:
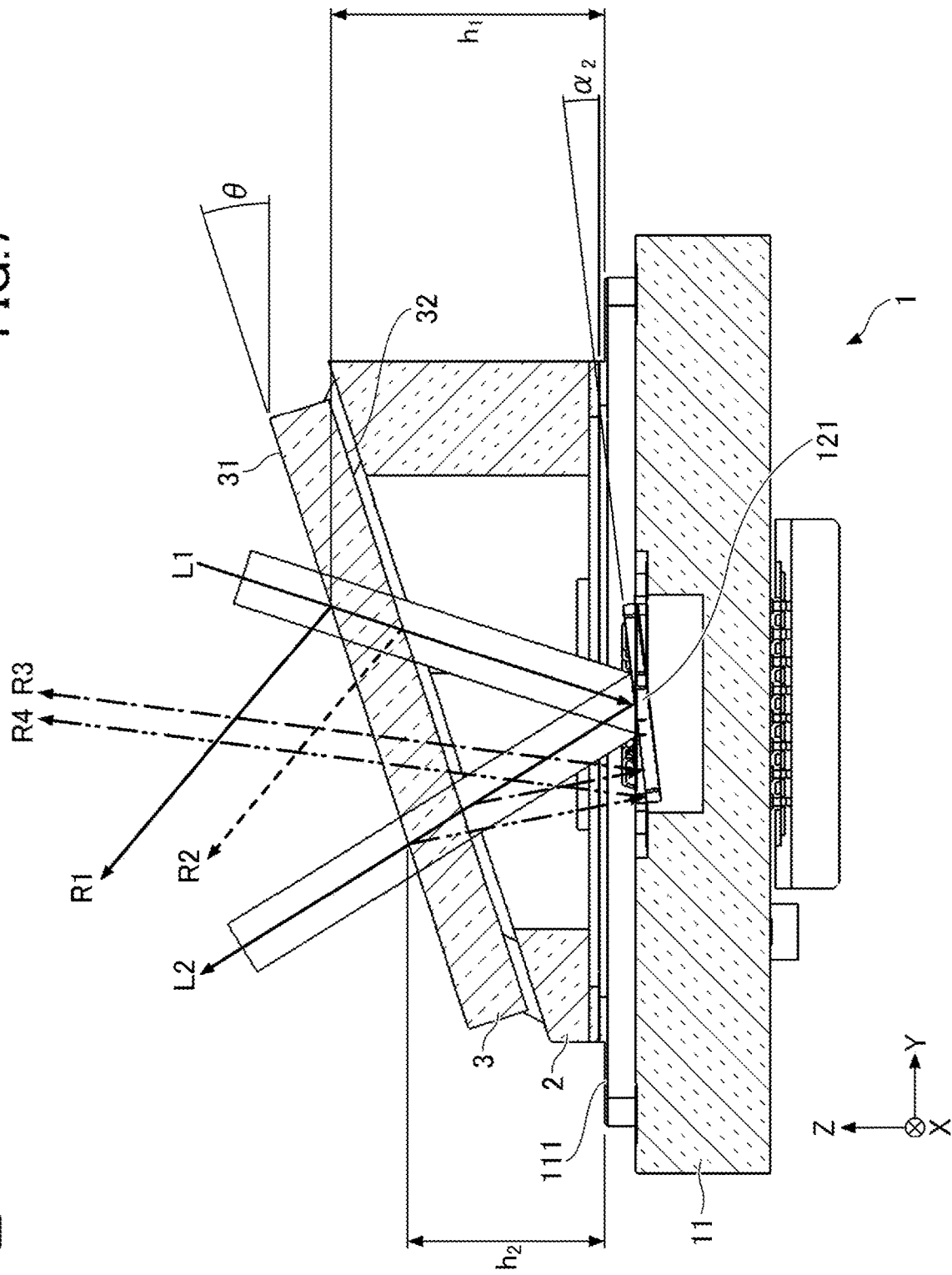
FIG. 7 is a cross sectional view illustrating inclination of a light transmission plate according to the embodiment.

Next, FIG. 7 is a drawing illustrating an example of an inclination of the light transmission plate 3 of the optical deflection apparatus 20. FIG. 7 is a cross-sectional view of the optical deflection apparatus 20 along the S-S cutting line of FIG. 6.

In FIG. 7, incident laser light L1 is transmitted through the light transmission plate 3 and is incident on the reflection surface 121 of the optical deflection part 12. After the incident laser light L1 is reflected by the reflection surface 121, output laser light L2 is transmitted through the light transmission plate 3.

A height $h_1$, with reference to the attachment surface 111, of a region of the light transmission plate 3 through which the incident laser light L1 incident on the reflection surface 121 of the optical deflection part 12 is transmitted is higher than a height $h_2$, with reference to the attachment surface 111, of a region of the light transmission plate 3 through which the output laser light L2 deflected by the optical deflection part 12 is transmitted.

Primary reflected laser light R1 is laser light that is reflected laser light of the incident laser light L1 reflected by the first surface 31 on +Z direction side of the light transmission plate 3. The secondary reflected laser light R2 is laser light that is reflected laser light of the incident laser light L1 reflected by the second surface 32 on −Z direction side of the light transmission plate 3.

The output laser light L2 is reflected by the second surface 32 of the light transmission plate 3, and thereafter, the reflected laser light is reflected again by the reflection surface 121. This reflected laser light is transmitted through the light transmission plate 3 to become tertiary reflected laser light R3. The output laser light L2 is reflected by the first surface 31 of the light transmission plate 3, and thereafter, the reflected laser light is reflected again by the reflection surface 121. This reflected laser light is transmitted through the light transmission plate 3 to become quaternary reflected laser light R4.

In this case, the effects of reflected light including reflected light that occurs at the light transmission plate 3 in the image projection apparatus 100 are explained in detail.

The light intensity of incident laser light L1 incident on the optical deflection apparatus 20 is defined as 100 [%]. The transmittance of the antireflection films provided on the first surface 31 and the second surface 32 of the light transmission plate 3 is defined as 98 [%].

In this case, when the incident laser light L1 is transmitted through the first surface 31 and the second surface 32, and the output laser light L2 is transmitted through the first surface 31 and the second surface 32, then, the light intensity of the output laser light L2 becomes 92 [%] ($0.98^4$=0.92).

For example, in a case where the output laser light L2 is scanned on the scan-target surface 200 to draw the image 201 on the scan-target surface 200 with a resolution of 720P (1280×720 [pixels]), the light intensity of the output laser light L2 for drawing 1 [pixel] of 1 frame is 0.0001 [%] (92/(1280×720)). Therefore, 1 [pixel] is drawn with a light intensity that is 0.0001 [%] of the light intensity of the incident laser light L1.

Conversely, in the image projection apparatus 100, when the primary reflected laser light R1 is included in the image 201 on the scan-target surface 200, the image 201 includes the primary reflected laser light R1 at a light intensity of 2 [%] of the light intensity of the incident laser light L1. This primary reflected laser light R1 has a light intensity that is 20000 times the light intensity of the output laser light L2 for drawing the image 201, and is emitted to a predetermined portion in the image 201 without moving.

Also, when the secondary reflected laser light R2 is included in the image 201 on the scan-target surface 200, the image 201 includes the secondary reflected laser light R2 at a light intensity of 0.019 [%] ($0.98^2$×0.02) of the light intensity of the incident laser light L1. This secondary reflected laser light R2 has a light intensity that is 190 times the light intensity of the output laser light L2 for drawing the image 201, and is emitted to a predetermined portion in the image 201 without moving.

Also, when the tertiary reflected laser light R3 is included in the image 201 on the scan-target surface 200, the image 201 includes the tertiary reflected laser light R3 at a light intensity of 0.018 [%] ($0.98^4$×0.02) of the light intensity of the incident laser light L1. This tertiary reflected laser light R3 has a light intensity that is 180 times the light intensity of the output laser light L2 for drawing the image 201, and draws the same image as the image 201 at a position shifted from the image 201 on the scan-target surface 200.

Also, when the quaternary reflected laser light R4 is included in the image 201 on the scan-target surface 200, the image 201 includes the quaternary reflected laser light R4 at a light intensity of 0.018 [%] ($0.98^5$×0.02) of the light intensity of the incident laser light L1. This quaternary reflected laser light R4 has a light intensity that is 180 times the light intensity of the output laser light L2 for drawing the image 201, and draws the same image as the image 201 at a position shifted from the image 201 on the scan-target surface 200.

In the present embodiment, the light transmission plate 3 is provided with an inclination with reference to the attachment surface 111, so that the image 201 does not include laser light reflected by the light transmission plate 3 such as from the primary reflected laser light R1 to the quaternary reflected laser light R4 and the like.

In this case, an inclination angle θ of FIG. 7 represents an inclination angle with reference to the attachment surface 111 of the light transmission plate 3. The light transmission plate 3 is inclined with an inclination angle θ with reference to the attachment surface 111 about the axis along the second swing axis B. The second maximum swing angle $\alpha_2$ represents the maximum swing angle about the second swing axis B corresponding to the axis along the X axis.

In the present embodiment, the inclination angle θ is defined so as to satisfy the condition expressed by the following expressions.

$$|\theta|=2\times\alpha_2+\beta_2$$

$$0<\beta_2\leq 90-2\times\alpha_2$$

where each of $\beta_1$ and $\beta_2$ denotes a selectable angle that means an angle that can be selected as appropriate. A sign | | denotes an absolute value. The second maximum swing angle $\alpha_2$, the inclination angle θ, and the selectable angles $\beta_1$ and $\beta_2$ are represented in units of [degrees].

When the inclination angle θ is set to a value greater than the second maximum swing angle $\alpha_2$, the primary reflected light R1 and the secondary reflected light R2 do not reach the scan-target surface 200, and are thus excluded from the image 201. Also, when the inclination angle θ is set to a value equal to greater than twice the second maximum swing angle $\alpha_2$, the tertiary reflected light R3 and the quaternary reflected light R4 do not reach the scan-target surface 200, and are thus excluded from the image 201.

Therefore, by defining the inclination angle θ to satisfy the above expression, each of the primary reflected laser light R1 to the quaternary reflected laser light R4 is excluded from the image 201. In the example as illustrated in FIG. 7, the second maximum swing angle $\alpha_2$ is 7.0 [degrees], and the selectable angle $\beta_2$ is 4.0 [degrees]. The inclination angle θ is defined as 18.0 [degrees] according to the above expressions.

Figure 8:
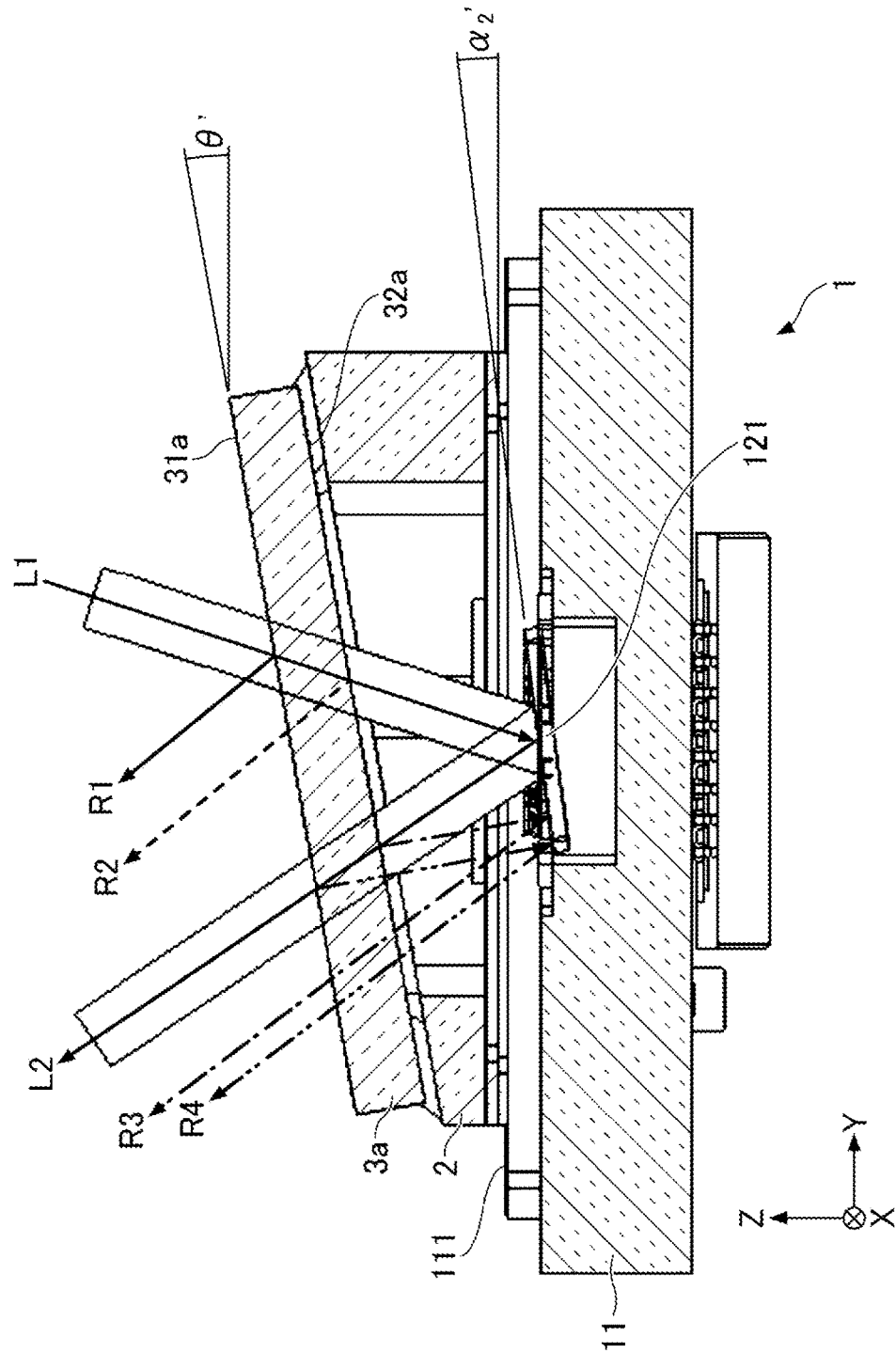
FIG. 8 is a cross sectional view illustrating inclination of a light transmission plate according to a comparative example.

Next, FIG. 8 is a drawing for explaining inclination of a light transmission plate 3a of an optical deflection apparatus 20a according to a comparative example. For the sake of comparison with the optical deflection apparatus 20 according to the embodiment, the optical deflection apparatus 20a illustrated in FIG. 8 is assumed to have substantially the same configuration as the optical deflection apparatus 20, and is different from the optical deflection apparatus 20 only in the inclination angle of the light transmission plate 3a with reference to the attachment surface 111 (reference surface).

FIG. 8 is a cross sectional view illustrating the optical deflection apparatus 20a taken along a line corresponding to a line S-S of FIG. 6. In FIG. 8, the respective components of the optical deflection apparatus 20a are denoted with the same reference numerals as the reference numerals of the optical deflection apparatus 20.

An inclination angle θ' of FIG. 8 represents an inclination angle of the light transmission plate 3a with reference to the attachment surface 111. A second maximum swing angle $\alpha_2'$ represents a maximum swing angle around the second swing axis B.

The inclination angle θ' is 11.0 [degrees], and the maximum swing angle is 7.0 [degrees]. The inclination angle θ' is greater than the second maximum swing angle $\alpha_2$, and therefore, the primary reflected light R1 and the secondary reflected light R2 are excluded from the image 201.

However, the inclination angle θ' is less than 14 [degrees] that is twice the second maximum swing angle $\alpha_2$, and therefore, the tertiary reflected light R3 and the quaternary reflected light R4 are emitted in a direction close to the output laser light L2 and are included in the image 201. As a result, the same image as the image 201 is projected at a position shifted from the image 201 on the scan-target surface 200, so that ghosting, in which multiple images are observed in an overlapping manner, moiré, or the like may occur.

<Effects of Optical Deflection Apparatus 20>

As explained above, the optical deflection apparatus 20 according to the present embodiment includes: the optical deflection part 12 that deflects laser light incident on the reflection surface 121 by swinging the reflection surface 121 about the first swing axis A (first axis) and about the second swing axis B (second axis); and the light transmission plate 3 that transmits laser light deflected by the optical deflection part 12.

Furthermore, in the present embodiment, the inclination angle of the light transmission plate 3 with reference to the attachment surface 111 (reference surface) is set to a value that is equal to or greater than twice the second maximum swing angle $\alpha_2$ of the reflection surface 121 with reference to the attachment surface 111. Accordingly, the primary reflected light R1, the secondary reflected light R2, the tertiary reflected light R3, and the quaternary reflected light R4 that are caused by the reflection at the light transmission plate 3 do not reach the scan-target surface 200. As a result, the projected image does not include the reflected light that is caused at the light transmission plate 3. Therefore, the quality of the projected image on the scan-target surface 200 is maintained at a high level.

In the embodiment explained above, although, for example, the light emitting unit 10 emits laser light that enters from the outside of the light transmission plate 3 to the inside of the optical deflection apparatus 20, the present embodiment is not limited thereto. The present embodiment can be applied even to a configuration in which the light emitting unit 10 is provided in the inside of the optical deflection apparatus 20 to allow the laser light to be incident on the reflection surface 121 without being transmitted through the light transmission plate 3.

Furthermore, in the present embodiment, the optical deflection part 12 deflects, in two direction that cross each other, the laser light incident on the reflection surface 121 by swinging the reflection surface 121 about both of the axes that are the first swing axis A and the second swing axis B crossing the first swing axis A. The first maximum swing angle $\alpha_1$ of the reflection surface 121 with reference to the attachment surface 111 about the first swing axis A is greater than the second maximum swing angle $\alpha_2$ of the reflection surface 121 with reference to the attachment surface 111 about the second swing axis B, and the light transmission plate 3 is inclined about the axis along the second swing axis B.

For example, in a case where the light transmission plate 3 is inclined about the first swing axis A, the light transmission plate 3 is to be inclined by 28.0 [degrees] (in a case where $\beta_1$ is 4.0 [degrees]) because the first maximum swing angle $\alpha_1$ is 12.0 degrees. Conversely, in a case where the light transmission plate 3 is inclined about the second swing axis B, the inclination angle of the light transmission plate 3 may be 18.0 [degrees]. Because the inclination angle of the light transmission plate 3 is smaller, the size of the package 11 or the lid 2, or both, can be reduced. In addition, the size of the optical deflection apparatus 20 can be reduced.

In the present embodiment, for example, the first swing axis A is configured to be along the Y direction, but the present embodiment is not limited thereto. The light transmission plate 3 may be inclined about the axis of which the maximum swing angle of the reflection surface 121 is smaller. In other words, the first swing axis A may be in any direction. For example, the first swing axis A may be configured to be along the X direction. Even in this configuration, the inclination angle of the light transmission plate 3 is relatively small, and accordingly, the size of the package 11 or the lid 2, or both, can be reduced, and the size of the optical deflection apparatus 20 can be reduced.

However, the present embodiment is not limited to the configuration in which the light transmission plate 3 is inclined about an axis along the second swing axis B in a case where the first maximum swing angle $\alpha_1$ of the reflection surface 121 with reference to the attachment surface 111 about the first swing axis A is greater than the second maximum swing angle $\alpha_2$ of the reflection surface 121 with reference to the attachment surface 111 about the second swing axis B. For example, the light transmission plate 3 may be configured to be inclined about an axis along the first swing axis A.

In the present embodiment, the height $h_1$, with reference to the attachment surface 111, of the region of the light transmission plate 3 through which the laser light incident on the reflection surface 121 is transmitted is higher than the height $h_2$, with reference to the attachment surface 111, of the region of the light transmission plate 3 through which the laser light deflected by the optical deflection part 12 is transmitted. According to this configuration, the size of the package 11 or the lid 2, or both, can be reduced, and the size of the optical deflection apparatus 20 can be reduced.

<Modified Examples of Optical Deflection Apparatus 20>

In this case, the optical deflection apparatus 20 can be modified in various ways. Hereinafter, modified examples are explained.

(Modified Examples of Optical Deflection Part)

First, modified examples of the optical deflection part is explained. In the above-described embodiment, for example, the optical deflection part 12 deflects laser light in two directions crossing each other, but the present embodiment is not limited thereto. For example, the optical deflection apparatus 20 may have an optical deflection part 12*a* that deflects, in a single direction, light incident on the reflection surface by swinging the reflection surface about a single swing axis.

Figure 9:
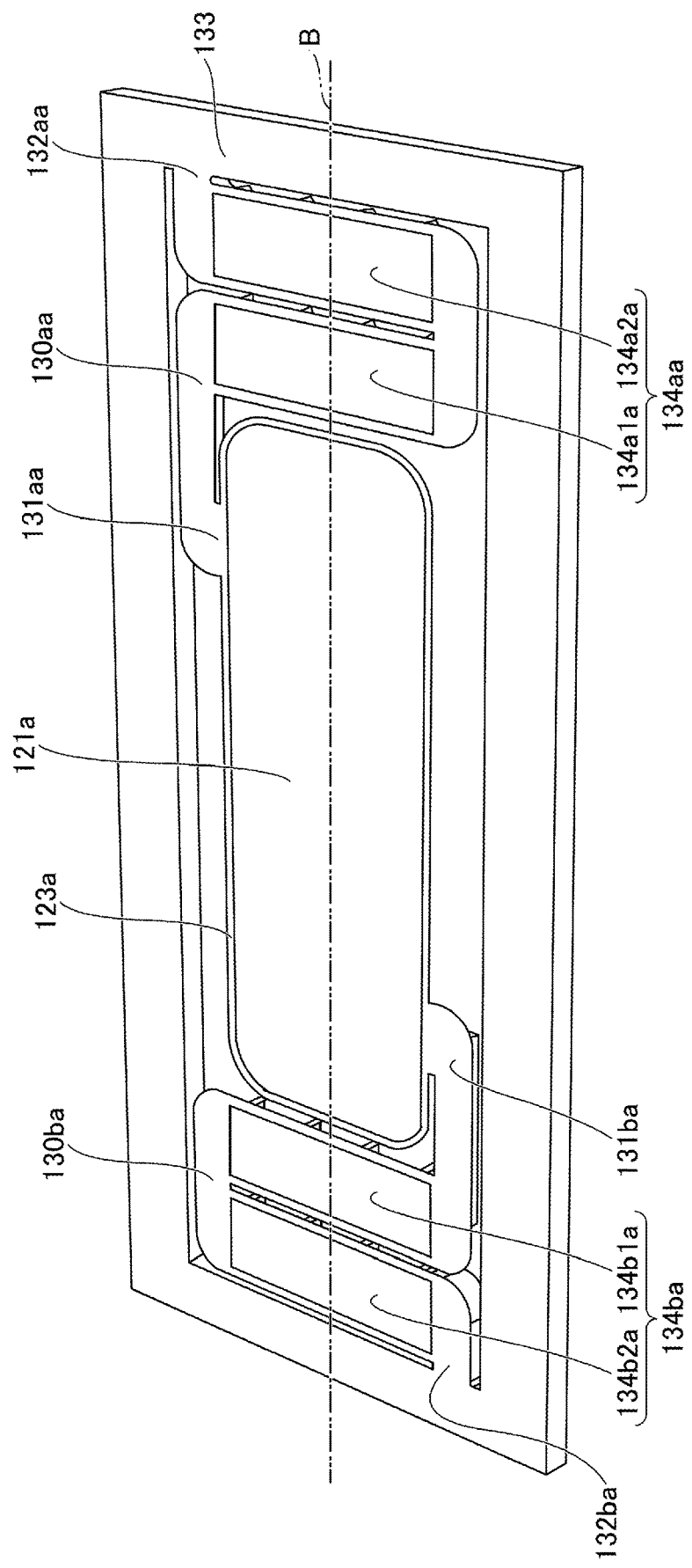
FIG. 9 is a perspective view illustrating an optical deflection part according to a first modified example of the embodiment.

In this case, FIG. 9 is a perspective view illustrating the optical deflection part 12*a* according to the first modified example of the embodiment. The optical deflection part 12*a* includes a reflection surface 121*a*, and deflects laser light reflected by the reflection surface 121*a* about the second swing axis B by swinging the reflection surface 121*a* about the second swing axis B. The optical deflection part 12*a* is, for example, a MEMS mirror or the like that drives the reflection surface 121*a* by a piezoelectric element.

As illustrated in FIG. 9, the optical deflection part 12*a* includes a reflection surface 121*a*, a support portion 123*a*, connection portions 131*aa* and 131*ba*, second driving beams 130*aa* and 130*ba*, drive sources 134*aa* and 134*ba*, fixed frame connection portions 132*aa* and 132*ba*, and a fixed frame 133*a*.

The optical deflection part 12*a* includes the support portion 123*a* including the reflection surface 121*a* instead of the movable frame 122 of the optical deflection part 12, and the functions of the components of the optical deflection part 12*a* are substantially the same as the functions of the corresponding components of the optical deflection part 12. Therefore, hereinafter, redundant explanation thereabout is omitted.

Figure 10:
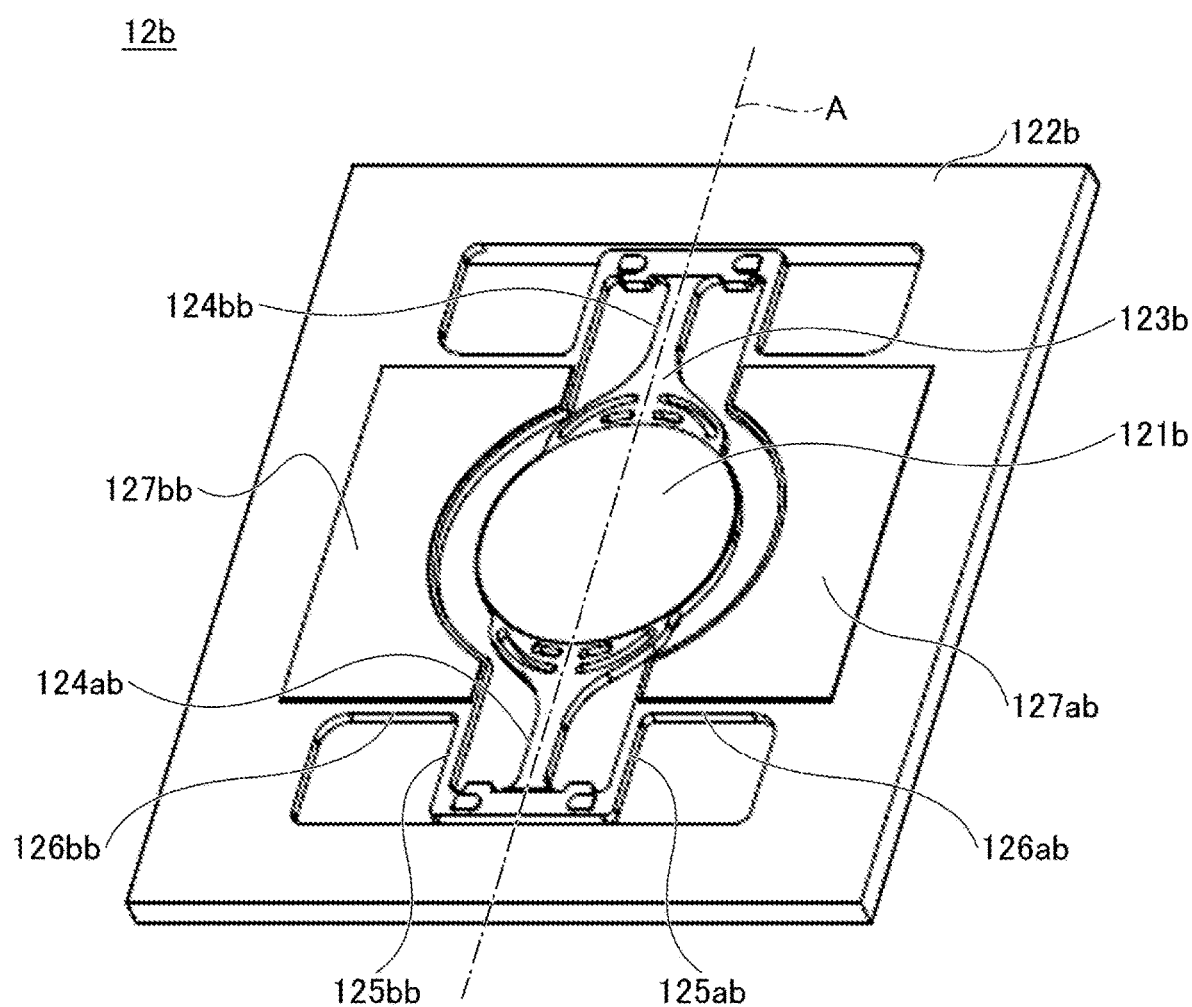
FIG. 10 is a perspective view illustrating an optical deflection part according to a second modified example of the embodiment.

Next, FIG. 10 is a perspective view illustrating an optical deflection part 12*b* according to a second modified example of the embodiment. The optical deflection part 12*b* includes a reflection surface 121*b*, and deflects laser light incident on the reflection surface 121*b* about the first swing axis A by swinging the reflection surface 121*b* about the first swing axis A. The optical deflection part 12*b* is, for example, a MEMS mirror or the like that drives the reflection surface 121*b* by a piezoelectric element.

As illustrated in FIG. 10, the optical deflection part 12*b* includes a reflection surface 121*b*, a movable frame 122*b*, a support portion 123*b*, torsional beams 124*ab* and 124*bb*, connection beams 125*ab* and 125*bb*, first driving beams 126*ab* and 126*bb*, and drive sources 127*ab* and 127*bb*.

In the optical deflection part 12*b*, components such as the second driving beams 130*a* and 130*b* and the like connected to the movable frame 122 of the optical deflection part 12 are not provided. The functions of the components of the optical deflection part 12*b* are substantially the same as the functions of the corresponding components of the optical deflection part 12. Therefore, hereinafter, redundant explanation thereabout is omitted.

The optical deflection apparatus 20 may include an optical deflection part for swinging the reflection surface about a single swing axis as illustrated in FIG. 9 and FIG. 10. In this case, the inclination angle of the light transmission plate 3 with reference to the attachment surface 111 is configured to be equal to or greater than twice the maximum swing angle of the reflection surface 121 with reference to the attachment surface 111, so that substantially the same effects as those achieved by the above-described optical deflection apparatus 20 can be obtained.

(Modified Example of Direction in which Light Transmission Plate 3 is Inclined)

Next, a modified example of the direction in which the light transmission plate 3 is explained. In the above-described embodiment, for example, the light transmission plate 3 is inclined about an axis along the second swing axis B, but the present embodiment is not limited thereto. For example, the light transmission plate 3 may be inclined about an axis along the first swing axis A at an inclination angle that is equal to or greater than twice the first maximum swing angle $\alpha_1$ of the reflection surface 121 about the first swing axis A.

Alternatively, the light transmission plate 3 may be inclined about an axis other than the axes along the first swing axis A and the second swing axis B. In other words, the light transmission plate 3 may be inclined about an axis that is included in a plane parallel to the attachment surface 111 and that is non-parallel to the first swing axis A and the second swing axis B.

Figure 11:
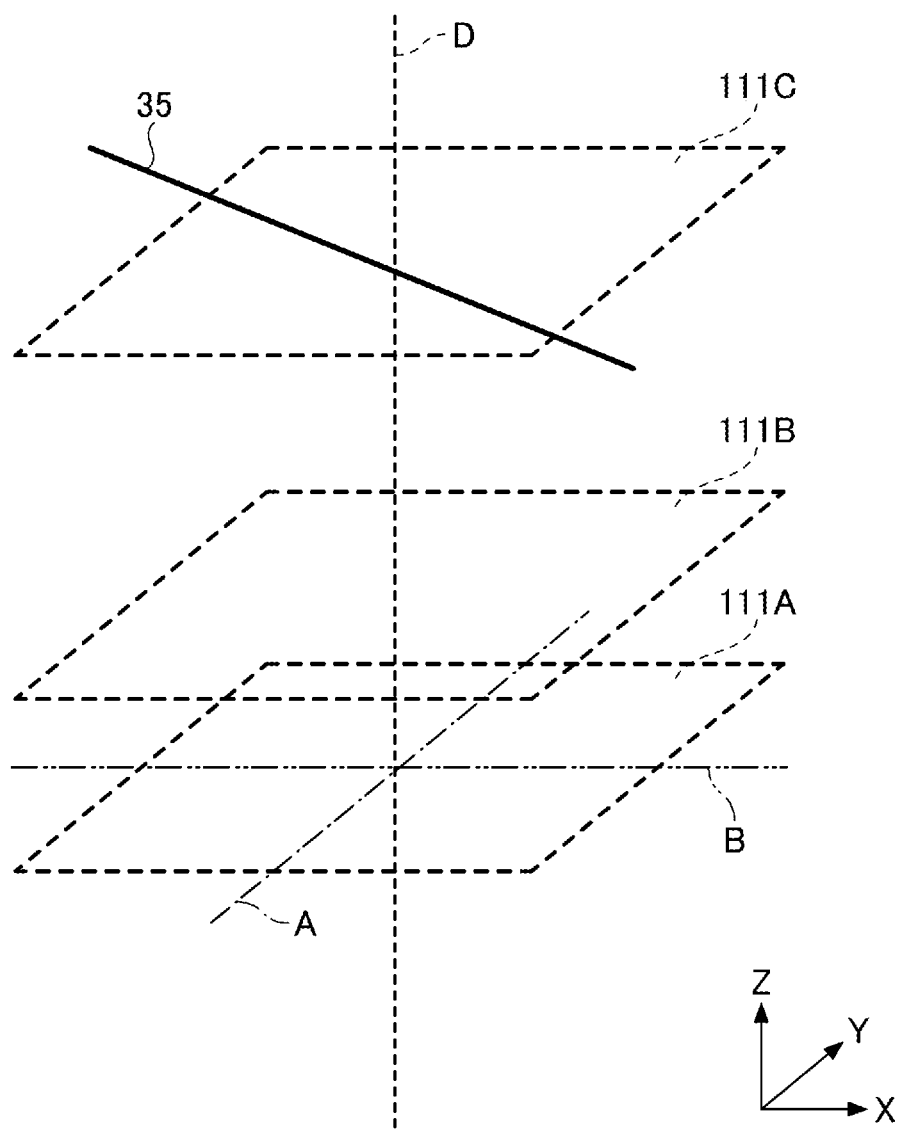
FIG. 11 is a drawing illustrating an example of inclination of the light transmission plate according to the embodiment.

In this case, FIG. 11 is a drawing illustrating an example of inclination of the light transmission plate 3. In FIG. 11, a plane 111A represents a plane including the first swing axis A and the second swing axis B, and a plane 111B represents a plane corresponding to the attachment surface 111 as the reference surface. A plane 111C represents a plane parallel to the attachment surface 111.

The inclination axis 35 is an axis that is included in the plane 111C (a plane parallel to the reference surface) and that is non-parallel to the first swing axis A and the second swing axis B. The light transmission plate 3 may be inclined about the inclination axis 35.

The inclination axis 35 may be an axis in any direction from among directions in 360 degrees about a perpendicular axis D that is perpendicular to each of the plane 111A, the plane 111B, and the plane 111C. Note that the inclination axis 35 does not have to be an axis passing through the perpendicular axis D.

In a case where the light transmission plate 3 is inclined about the inclination axis 35, a condition expressed by the following expressions is preferably satisfied, where the inclination angle of the light transmission plate 3 about the first swing axis A is denoted as $\theta_1$, and the inclination angle of the light transmission plate 3 about the second swing axis B is denoted as $\theta_2$.

$$|\theta_1|=2\times\alpha_1+\beta_1$$

$$|\theta_2|=2\times\alpha_2+\beta_2$$

$$0<\beta_1\leq 90-2\times\alpha_1$$

$$0<\beta_2\leq 90-2\times\alpha_2$$

Note that each of $\beta_1$ and $\beta_2$ denotes a selectable angle, and $\alpha_1$, $\alpha_2$, $\theta_1$, $\theta_2$, $\beta_1$, and $\beta_2$ are in units of [degrees]. When the above condition is satisfied, substantially the same effects as those achieved by the above-described optical deflection apparatus 20 can be obtained.

In a case where the optical deflection apparatus 20 includes an optical deflection part 12 that swings the reflection surface 121 about a single swing axis, the light transmission plate 3 is preferably inclined about an inclination axis 35 that is included in the plane 111C parallel to the attachment surface 111 and that is non-parallel to the swing axis. Therefore, the size of the package 11 or the lid 2, or both, can be reduced.

(Modified Examples of Incidence Height of Incident Laser Light L1 Incident to Light Transmission Plate 3)

In the above-described embodiment, for example, the height $h_1$, with reference to the attachment surface 111, of a region of the light transmission plate 3 through which the incident laser light L1 is transmitted is configured to be higher than the height $h_2$, with reference to the attachment surface 111, of a region of the light transmission plate 3 through which the output laser light L2 is transmitted, but the present embodiment is not limited thereto.

For example, the height, with reference to the attachment surface 111, of a region of the light transmission plate 3 through which the incident laser light L2 is transmitted may be higher than the height, with reference to the attachment surface 111, of a region of the light transmission plate 3 through which the incident laser light $L_1$ is transmitted. Alternatively, the height, with reference to the attachment surface 111, of a region of the light transmission plate 3 through which the incident laser light $L_1$ is transmitted may be equal to the height, with reference to the attachment surface 111, of a region of the light transmission plate 3 through which the incident laser light L2 is transmitted.

(Combination Example of Incidence Height of Incident Laser Light $L_1$ and Inclination of Light Transmission Plate 3)

Next, various combinations of the incidence height of the incident laser light $L_1$ to the light transmission plate 3 and the inclination of the light transmission plate 3 are explained with reference to FIGS. 12A and 12B to FIGS. 14A and 14B.

Figure 12A:
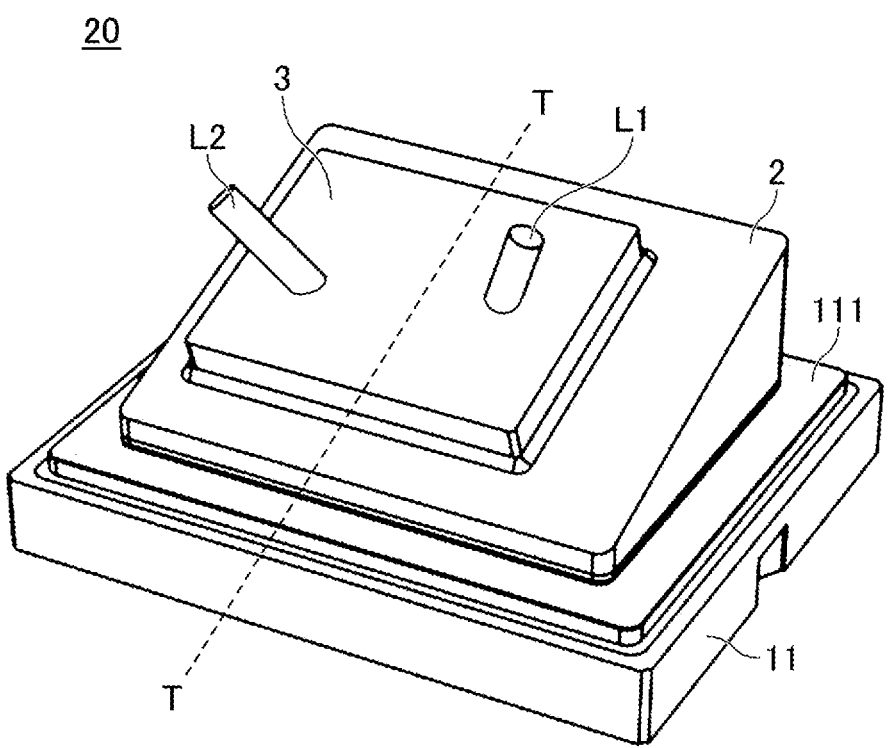
FIG. 12A is a perspective view of a first example of a combination of the height of the incident laser light and the inclination of the light transmission plate.

FIG. 12A is a perspective view of a first modified example of a combination of the height of the incident laser light and the inclination of the light transmission plate 3. FIG. 12B is a cross-sectional view taken along line T-T of FIG. 12A. In FIGS. 12A and 12B, along the plane including the second swing axis B along the X axis, the incident laser light L1 is incident on the optical deflection apparatus 20, and the output laser light is output from the optical deflection apparatus 20. The light transmission plate 3 is inclined about the second swing axis B along the X axis.

In this case, the inclination angle θ of the light transmission plate 3 is preferably equal to or greater than twice the second maximum swing angle $\alpha_2$ of the reflection surface 121. Particularly preferably, the inclination angle θ of the light transmission plate 3 is equal to a value obtained by adding 2.0 [degrees], as the selectable angle 32, to twice the second maximum swing angle $\alpha_2$ of the reflection surface 121.

Next, FIG. 13A is a perspective view of a second modified example of a combination of the height of the incident laser light and the inclination of the light transmission plate 3. FIG. 13B is a cross-sectional view taken along line U-U of FIG. 13A. In FIG. 13, along the plane including the first swing axis A along the X axis, the incident laser light $L_1$ is incident on the optical deflection apparatus 20, and the output laser light is output from the optical deflection apparatus 20. The light transmission plate 3 is inclined about the first swing axis A along the Y axis.

In this case, the inclination angle θ of the light transmission plate 3 is preferably equal to or greater than twice the first maximum swing angle $\alpha_1$ of the reflection surface 121. Particularly preferably, the inclination angle θ of the light transmission plate 3 is equal to a value obtained by adding 2.0 [degrees], as the selectable angle 32, to twice the first maximum swing angle $\alpha_1$ of the reflection surface 121.

Next, FIG. 14A is a perspective view of a third modified example of a combination of the height of the incident laser light and the inclination of the light transmission plate 3. FIG. 14B is a cross-sectional view taken along line V-V of FIG. 14A. In FIG. 14, along the plane including the first swing axis A along the Y axis, the incident laser light $L_1$ is incident on the optical deflection apparatus 20, and the output laser light is output from the optical deflection apparatus 20. The light transmission plate 3 is inclined about the first swing axis A along the Y axis.

In this case, the inclination angle θ of the light transmission plate 3 is preferably equal to or greater than twice the first maximum swing angle $\alpha_1$ of the reflection surface 121. Particularly preferably, the inclination angle θ of the light transmission plate 3 is equal to a value obtained by adding 2.0 [degrees], as the selectable angle 32, to twice the first maximum swing angle $\alpha_1$ of the reflection surface 121.

Although the embodiment has been described above, the present invention is not limited to the above-described embodiment, and various modifications and changes can be made without departing from the subject matter described in the claims.

The numbers such as ordinal numbers and quantities used in the explanation of the embodiment are all shown as examples to specifically explain the techniques related to the present disclosure, and the present invention is not limited to the numbers shown in the examples. Also, the connection relationships between components are shown as examples to specifically explain the techniques of the present disclosure, and the connection relationships that achieve the function of the present disclosure are not limited thereto.

What is claimed is:

1. An optical deflection apparatus comprising:
    an optical deflection part configured to deflect light incident on a reflection surface by swinging the reflection surface about a swing axis; and
    a light transmission plate configured to transmit the light deflected by the optical deflection part and project an image on a scan-target surface,
    wherein an inclination angle of the light transmission plate with reference to a reference surface is equal to or greater than twice a maximum swing angle of the reflection surface with reference to the reference surface, the inclination angle of the light transmission plate being configured such that the light, which is reflected by a surface of the light transmission plate and goes back to the optical deflection part, is prevented from reaching the scan-target surface.

2. The optical deflection apparatus according to claim 1, wherein the light transmission plate is inclined about an axis that is included in a plane parallel to the reference surface and that is non-parallel to the swing axis.

3. The optical deflection apparatus according to claim 1, wherein the optical deflection part deflects, in two directions crossing each other, the light incident on the reflection surface by swinging the reflection surface about both axes that are a first axis and a second axis crossing the first axis,
    a first maximum swing angle of the reflection surface with reference to the reference surface about the first axis is greater than a second maximum swing angle of the reflection surface with reference to the reference surface about the second axis, and
    the light transmission plate is inclined about an axis along the second axis.

4. The optical deflection apparatus according to claim 3, wherein where the first maximum swing angle is denoted as $\alpha_1$, the second maximum swing angle is denoted as $\alpha_2$, an inclination angle of the light transmission plate about the first axis is denoted as $\theta_1$, and an inclination angle of the light transmission plate about the second axis is denoted as $\theta_2$, the optical deflection apparatus satisfies a condition expressed by:

$$|\theta_1|=2\times\alpha_1+\beta_1;$$

$$|\theta_2|=2\times\alpha_2+\beta_2;$$

$$0\leq\beta_1\leq90-2\times\alpha_1; \text{ and}$$

$$0\leq\beta_2\leq90-2\times\alpha_2,$$

in which each of $\beta_1$ and $\beta_2$ denotes a selectable angle, $|\theta_1|$ denotes an absolute value of $\theta_1$, $|\theta_2|$ denotes an absolute value of $\theta_2$, and $\alpha_1$, $\alpha_2$, $\theta_1$, $\theta_2$, $\beta_1$, and $\beta_2$ are in units of degrees.

5. The optical deflection apparatus according to claim 1, wherein the optical deflection part deflects, in two directions crossing each other, the light incident on the reflection surface by swinging the reflection surface about both axes that are a first axis and a second axis crossing the first axis,
a first maximum swing angle of the reflection surface with reference to the reference surface about the first axis is greater than a second maximum swing angle of the reflection surface with reference to the reference surface about the second axis, and
the light transmission plate is inclined about an axis along the first axis.

6. The optical deflection apparatus according to claim 1, wherein the light is transmitted through the light transmission plate and is then incident on the reflection surface, and
a height, with reference to the reference surface, of a region of the light transmission plate through which the light incident on the reflection surface is transmitted is higher than a height, with reference to the reference surface, of a region of the light transmission plate through which the light deflected by the optical deflection part is transmitted.

7. The optical deflection apparatus according to claim 1, wherein the reference surface is parallel to the scan-target surface.

8. An image projection apparatus comprising:
a light emitting unit configured to emit light; and
an optical deflection apparatus,
wherein the optical deflection apparatus includes:
an optical deflection part configured to, by swinging a reflection surface about a swing axis, deflect the light that is emitted by the light emitting unit and that is incident on the reflection surface; and
a light transmission plate configured to transmit the light deflected by the optical deflection part and project an image on a scan-target surface,
wherein an inclination angle of the light transmission plate with reference to a reference surface is equal to or greater than twice a maximum swing angle of the reflection surface with reference to the reference surface, the inclination angle of the light transmission plate being configured such that the light, which is reflected by a surface of the light transmission plate and goes back to the optical deflection part, is prevented from reaching the scan-target surface, and
wherein the light is scanned by the optical deflection apparatus to project the image on the scan-target surface.

9. An optical deflection apparatus comprising:
an optical deflection part configured to deflect light incident on a reflection surface by swinging the reflection surface about a swing axis; and
a light transmission plate configured to transmit the light deflected by the optical deflection part,
wherein an inclination angle of the light transmission plate with reference to a reference surface is equal to or greater than twice a maximum swing angle of the reflection surface with reference to the reference surface,
wherein the optical deflection part deflects, in two directions crossing each other, the light incident on the reflection surface by swinging the reflection surface about both axes that are a first axis and a second axis crossing the first axis,
wherein a first maximum swing angle of the reflection surface with reference to the reference surface about the first axis is greater than a second maximum swing angle of the reflection surface with reference to the reference surface about the second axis,
wherein the light transmission plate is inclined about an axis along the second axis, and
wherein where the first maximum swing angle is denoted as $\alpha_1$, the second maximum swing angle is denoted as $\alpha_2$, an inclination angle of the light transmission plate about the first axis is denoted as $\theta_1$, and an inclination angle of the light transmission plate about the second axis is denoted as $\theta_2$, the optical deflection apparatus satisfies a condition expressed by:

$|\theta_1|=2\times\alpha_1+\beta_1;$ $|\theta_2|=2\times\alpha_2+\beta_2;$ $0\leq\beta_1\leq 90-2\times\alpha_1;$ and $0\leq\beta_2\leq 90-2\times\alpha_2,$ in which each of $\beta_1$ and $\beta_2$ denotes a selectable angle, $|\theta_1|$ denotes an absolute value of $\theta_1$, $|\theta_2|$ denotes an absolute value of $\theta_2$, and $\alpha_1$, $\alpha_2$, $\theta_1$, $\theta_2$, $\beta_1$, and $\beta_2$ are in units of degrees.

* * * * *